United States Patent
Tao

(10) Patent No.: US 11,212,766 B2
(45) Date of Patent: Dec. 28, 2021

(54) DATA TRANSMISSION METHODS, APPARATUSES, BASE STATIONS AND SERVERS

(71) Applicant: Alibaba Group Holding Limited, Grand Cayman (KY)

(72) Inventor: Zhen Tao, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 6 days.

(21) Appl. No.: 16/796,838

(22) Filed: Feb. 20, 2020

(65) Prior Publication Data
US 2020/0196266 A1 Jun. 18, 2020

Related U.S. Application Data

(63) Continuation of application No. PCT/CN2018/100190, filed on Aug. 13, 2018.

(30) Foreign Application Priority Data

Aug. 24, 2017 (CN) .......................... 201710737865.X

(51) Int. Cl.
*H04W 56/00* (2009.01)
*H04L 1/00* (2006.01)
(Continued)

(52) U.S. Cl.
CPC ....... *H04W 56/0065* (2013.01); *H04L 1/0002* (2013.01); *H04L 1/0007* (2013.01); *H04W 88/08* (2013.01); *H04W 88/16* (2013.01)

(58) Field of Classification Search
CPC ............. H04W 56/001; H04W 56/002; H04W 56/003; H04W 56/004; H04W 56/0045; H04W 56/0055–0085
See application file for complete search history.

(56) References Cited

U.S. PATENT DOCUMENTS 6,307,840 B1 10/2001 Wheatley, III et al.
6,961,398 B2 11/2005 Dick et al.
(Continued)

FOREIGN PATENT DOCUMENTS

CN 203142701 U 8/2013
CN 103905135 A 7/2014
(Continued)

OTHER PUBLICATIONS

Translation of International Search Report dated Oct. 25, 2018, from corresponding PCT Application No. PCT/CN12018/100190, 2 pages.
(Continued)

*Primary Examiner* — Pao Sinkantarakorn
(74) *Attorney, Agent, or Firm* — Lee & Hayes, P.C.

(57) ABSTRACT

Data transmission methods, apparatuses, base stations, and servers are provided, and relate to the field of the Internet of things. A data transmission method includes determining a system time difference between a first base station and a second base station based on an actual transmission time length of a wireless frame; modifying a sending time of first data according to the system time difference, the sending time of the first data being determined according to a receiving time of second data at the first base station; and sending the first data from the second base station according to the modified sending time of the first data. The present disclosure can reduce the data transmission cost, and improves the reliability of data transmission.

20 Claims, 16 Drawing Sheets

(51) Int. Cl.
*H04W 88/08* (2009.01)
*H04W 88/16* (2009.01)

(56) References Cited

U.S. PATENT DOCUMENTS

| | | | |
|---|---|---|---|
| 8,145,247 B2 | 3/2012 | Fullam | |
| 8,379,628 B2 | 2/2013 | Futaki et al. | |
| 8,462,712 B2 | 6/2013 | Yamada et al. | |
| 8,675,666 B2 | 3/2014 | Wu et al. | |
| 8,774,084 B2 | 7/2014 | Palanki et al. | |
| 9,055,527 B2 | 6/2015 | Zhang et al. | |
| 9,107,077 B2 | 8/2015 | Tujkovic et al. | |
| 9,312,977 B1 | 4/2016 | Khuu et al. | |
| 9,807,716 B2 | 10/2017 | Ro et al. | |
| 10,375,662 B2 | 8/2019 | Feng et al. | |
| 2003/0007470 A1* | 1/2003 | Grilli | H04W 56/002 370/335 |
| 2007/0115842 A1* | 5/2007 | Matsuda | G01S 5/021 370/252 |
| 2015/0312870 A1* | 10/2015 | Koorapaty | H04W 56/0015 370/350 |
| 2016/0094268 A1 | 3/2016 | Seller | |
| 2018/0176873 A1* | 6/2018 | Wang | H04W 56/001 |

FOREIGN PATENT DOCUMENTS

| | | |
|---|---|---|
| CN | 106556853 A | 4/2017 |
| CN | 106656386 A | 5/2017 |
| WO | WO2011075887 A1 | 6/2011 |
| WO | WO2014071579 A1 | 5/2014 |
| WO | WO2017129447 A1 | 8/2017 |

OTHER PUBLICATIONS

Translation of Office Action dated Jul. 28, 2020, from corresponding CN Patent Application No. 201710737865.X, 5 pages.
Translation of Search Report dated Jul. 21, 2020, from corresponding CN Patent Application No. 201710737865.X. 2 pages.
Translation of Written Opinion dated Oct. 25, 2018, from corresponding PCT Application No. PCT/CN12018/100190, 5 pages.

* cited by examiner

S902

A FIRST BASE STATION SENDS REFERENCE TIME INFORMATION TO A SECOND BASE STATION, SO THAT A SYSTEM TIME DIFFERENCE BETWEEN THE FIRST BASE STATION AND THE SECOND BASE STATION IS OBTAINED BASED ON A SENDING TIME OF THE REFERENCE TIME INFORMATION CARRIED IN THE REFERENCE TIME INFORMATION AND A RECEIVING TIME OF RECEIVING THE REFERENCE TIME INFORMATION, AND AN ACTUAL TRANSMISSION TIME LENGTH OF A WIRELESS FRAME, AND A SENDING TIME OF SENDING FIRST DATA BY THE SECOND BASE STATION IS MODIFIED ACCORDING TO THE SYSTEM TIME DIFFERENCE, WHEREIN THE SENDING TIME OF THE FIRST DATA IS DETERMINED ACCORDING TO A RECEIVING TIME OF SECOND DATA AT THE FIRST BASE STATION

FIG. 9

DATA TRANSMISSION METHODS, APPARATUSES, BASE STATIONS AND SERVERS

CROSS REFERENCE TO RELATED PATENT APPLICATIONS

This application claims priority to and is a continuation of PCT Patent Application No. PCT/CN2018/100190 filed on 13 Aug. 2018, and is related to and claims priority to Chinese Application No. 201710737865.X, filed on 24 Aug. 2017 and entitled "Data Transmission Methods, Apparatuses, Base Stations and Servers," which are incorporated herein by reference in their entirety.

TECHNICAL FIELD

The present disclosure relates to the technical field of the Internet of things, and particularly to data transmission methods, apparatuses, base stations, and servers.

BACKGROUND

The Internet of Things technology represents the third information technology revolution after the computer and the Internet, having advantages such as timeliness and interactivity, and having been widely used in a number of fields such as city management, digital home, positioning and navigation, logistics management, security system, etc. LoRa (Long Range) is an ultra-long-distance transmission solution based on a spread-spectrum technology in the Internet of Things, and has characteristics of a long transmission distance, a low power consumption, multiple nodes, and a low cost, etc.

In existing data transmission methods, a LoRa network usually includes terminals (i.e., nodes), base stations, and servers. Since a terminal can send uplink data or receive downlink data through different base stations, but a receiving time of the downlink data received by the terminal usually depends strictly on a sending time of the uplink data sent by the terminal, a transmission of data among the terminal, a base station, and a server in the LoRa network usually relies on maintaining of a synchronization of system clocks among each base station of the LoRa network. Therefore, a global positioning system (Global Positioning System, GPS) is usually set in each base station, and the time of the global positioning system is used as the system time of the base station, thereby achieving time synchronization among the base stations.

However, in existing technologies, an additional global positioning system needs to be deployed in a base station to achieve a synchronization of system times among base stations, which may increase the cost of data transmission. Furthermore, signals of the global positioning system are also easily restricted by an environment thereof, such as being blocked by buildings or trees, influenced by weather, etc., thereby affecting the synchronization of the system times among the base stations and reducing the reliability of data that is transmitted.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above problems, the present disclosure is proposed to provide data transmission methods, apparatuses, base stations, and servers that solve the above problems or at least partially solve the above problems.

In implementations, a data transmission method is provided, which includes:

determining a system time difference between a first base station and a second base station based on an actual transmission time length of a wireless frame;

modifying a sending time of first data according to the system time difference, the sending time of the first data being determined according to a receiving time of second data at the first base station; and sending the first data from the second base station according to the modified sending time of the first data.

In implementations, determining the system time difference between the first base station and the second base station based on the actual transmission time length of the wireless frame includes:

determining a difference between a measured transmission time length taken for the wireless frame from being sent from the first base station to being received at the second base station and the actual transmission time length as the system time difference between the first base station and the second base station.

In implementations, the wireless frame is reference time information, the reference time information including a sending time of the reference time information.

In implementations, determining the difference between the measured transmission time length taken for the wireless frame from being sent from the first base station to being received at the second base station and the actual transmission time length as the system time difference between the first base station and the second base station includes:

obtaining a sending time of sending the reference time information from the first base station and a receiving time of receiving the reference time information by the second base station;

determining the measured transmission time length based on the sending time of sending the reference time information and the receiving time of receiving the reference time information; and using the difference between the measured transmission time length and the actual transmission time length as the system time difference between the first base station and the second base station.

In implementations, when determining the difference between the measured transmission time length taken for the wireless frame from being sent from the first base station to being received at the second base station and the actual transmission time length as the system time difference between the first base station and the second base station, the method further includes:

determining the actual transmission time length taken for the wireless frame from being sent from the first base station to being received by the second base station.

In implementations, determining the actual transmission time length taken for the wireless frame from being sent from the first base station to being received by the second base station includes:

determining a round trip time duration of the wireless frame between the first base station and the second base station; and determining a half of the round-trip time duration as the actual transmission time length.

In implementations, determining the system time difference between the first base station and the second base station based on the actual transmission time length of the wireless frame includes:

receiving a system time difference between the first base station and the second base station sent by a server.

In implementations, before modifying the sending time of the first data according to the system time difference, the method further includes:

determining the sending time of the first data according to the receiving time of the second data.

In implementations, before determining the sending time of the first data according to the receiving time of the second data, the method further includes:

receiving the receiving time of the second data that is informed by the first base station.

In implementations, before modifying the sending time of the first data according to the system time difference, the method further includes:

receiving a sending time of the first data sent by a server, the sending time of the first data being determined according to the receiving time of the second data at the first base station.

In implementations, before determining the system time difference between the first base station and the second base station based on the actual transmission time length of the wireless frame, the method further includes:

selecting the second base station that sends the first data.

In implementations, a data transmission method is provided, which includes:

sending reference time information by a first base station to a second base station, obtaining a system time difference between the first base station and the second base station based on an actual transmission time length of a wireless frame according to a sending time of the reference time information included in the reference time information and a receiving time of receiving the reference time information, and modifying a sending time of first data sent by the second base station according to the system time difference, wherein the sending time of the first data is being determined based on a receiving time of second data at the first base station.

In implementations, sending the reference time information by the first base station to the second base station includes:

sending the reference time information to at least one base station in a same communication area.

In implementations, before sending the reference time information by the first base station to the second base station, the method further includes:

receiving the second data.

Optional, the method further includes:

determining the second base station selected by a server for sending the first data.

In implementations, a data transmission apparatus is provided, and includes:

a system time difference determination module configured to determine a system time difference between a first base station and a second base station based on an actual transmission time length of a wireless frame;

a sending time modification module configured to modify a sending time of first data according to the system time difference, the sending time of the first data being determined according to a receiving time of second data at the first base station; and a first data sending module configured to send the first data from the second base station according to the modified sending time of the first data.

In implementations, a data transmission apparatus is provided, and includes:

a reference time information sending module configured to send reference time information by a first base station to a second base station, obtain a system time difference between the first base station and the second base station based on an actual transmission time length of a wireless frame according to a sending time of the reference time information included in the reference time information and a receiving time of receiving the reference time information, and modify a sending time of first data sent by the second base station according to the system time difference, wherein the sending time of the first data is being determined based on a receiving time of second data at the first base station.

In implementations, a base station is provided, and includes:

a system time difference determination module configured to determine a system time difference between a first base station and a second base station based on an actual transmission time length of a wireless frame;

a sending time modification module configured to modify a sending time of first data according to the system time difference, the sending time of the first data being determined according to a receiving time of second data at the first base station; and a first data sending module configured to send the first data from the second base station according to the modified sending time of the first data.

In implementations, a server is provided, and includes:

a system time difference determination module configured to determine a system time difference between a first base station and a second base station based on an actual transmission time length of a wireless frame;

a sending time modification module configured to modify a sending time of first data according to the system time difference, the sending time of the first data being determined according to a receiving time of second data at the first base station; and a first data sending module configured to send the first data from the second base station according to the modified sending time of the first data.

In implementations, a base station is provided, and includes:

a reference time information sending module configured to send reference time information by a first base station to a second base station, obtain a system time difference between the first base station and the second base station based on an actual transmission time length of a wireless frame according to a sending time of the reference time information included in the reference time information and a receiving time of receiving the reference time information, and modify a sending time of first data sent by the second base station according to the system time difference, wherein the sending time of the first data is being determined based on a receiving time of second data at the first base station.

In implementations, a computing device is provided, includes memory, a processor, and a computer program stored on the memory and executable by the processor, the processor implementing one or more of the aforementioned methods when executing the computer program.

In implementations, a computer-readable storage medium is provided, which stores a computer program that, when executed by a processor, implements one or more of the aforementioned methods.

In the embodiments of the present disclosure, a system time difference between a first base station and a second base station can be determined based on an actual transmission time length of a wireless frame. Therefore, when a sending time of first data is determined according to a receiving time of second data that is received by the first base station, the sending time of the first data can be modified according to the system time difference, and the first data is sent from the second base station at the modified sending time of the first data. Since a process of data transmission does not need to rely on a synchronization of system times of each base station, the problem of rising data transmission costs that may be caused by a global positioning system of each base station can be avoided, and the problem of difficulty of conducting reliable data transmission caused by the inability of each base station to accurately receive positioning signals can be alleviated. In other words, the data transmission cost is reduced, and the reliability of data transmission is improved.

The above description is only an overview of the technical solutions of the present disclosure. In order to enable a clearer understanding of the technical means of the present disclosure, to enable implementations in accordance with the content of the description, and to make the above and other purposes, features, and advantages of the present disclosure to be more apparent and understood easily, specific implementations of the present disclosure is provided hereinafter.

BRIEF DESCRIPTION OF THE DRAWINGS

Various other advantages and benefits will become apparent to one of ordinary skill in the art upon reading the detailed description of the exemplary embodiments in the following text. The accompanying drawings are used for the purpose of illustrating the exemplary embodiments only, and are not to be considered as limiting the present disclosure. Moreover, same reference numerals are used throughout the accompanying drawings to refer to the same components. In the drawings:

FIG. 9 shows a flowchart of a data transmission method according to a sixth embodiment of the present disclosure.

DETAILED DESCRIPTION

Figure 1:
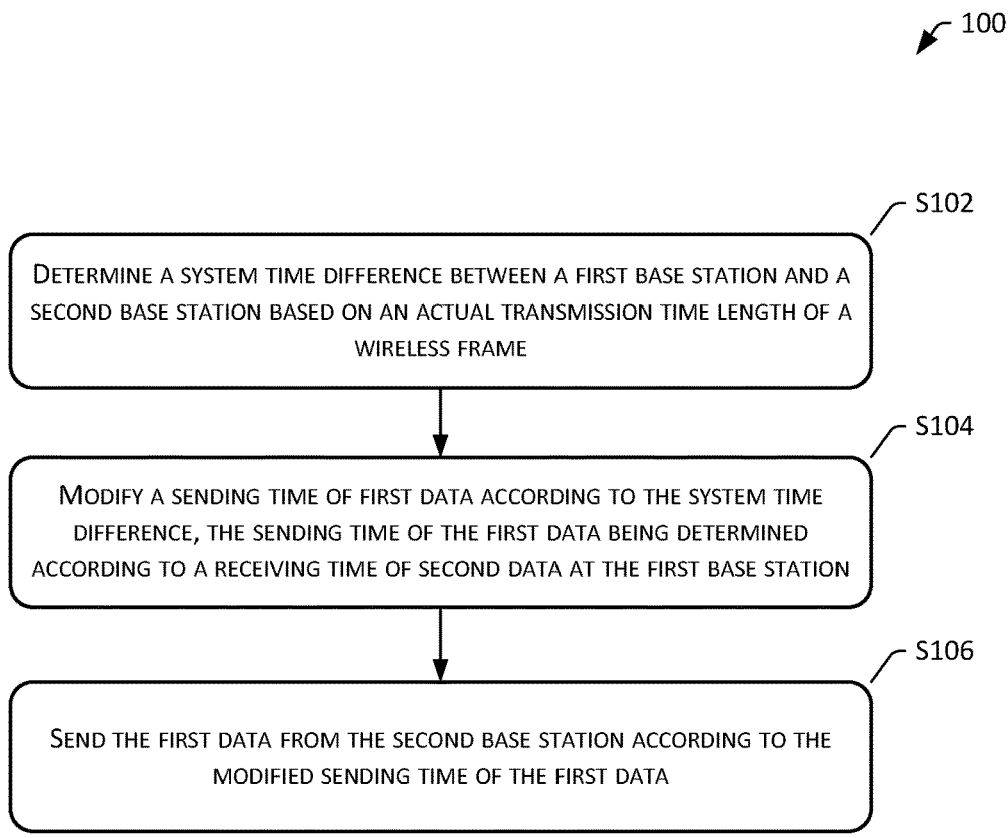
FIG. 1 shows a flowchart of a data transmission method according to a first embodiment of the present disclosure.

Exemplary embodiments of the present disclosure will be described in more detail hereinafter with reference to the accompanying drawings. Although the accompanying drawings show the exemplary embodiments of the present disclosure, it should be understood that the present disclosure can be implemented in various forms, and should not be limited by the embodiments that are set forth herein. Rather, these embodiments are provided to enable a thorough understanding of the present disclosure, and to fully convey the scope of the present disclosure to one skilled in the art.

In order to facilitate one skilled in the art to deeply understand the embodiments of the present disclosure, definitions of professional terms involved in the embodiments of the present disclosure are first introduced below.

A terminal has a capability of connecting to LoRa network and accesses the LoRa network. According to different application scenarios deployed on the LoRa network, the terminal may include different electronic devices. For example, when the LoRa network is used in city management, the terminal may include a smart meter. When the LoRa network is used in a digital home, the terminal may include various smart home appliances, etc.

A base station, which is also known as a gateway or concentrator in the LoRa network, has a function of wireless connection and aggregation, includes an entry for providing terminals with accesses to the LoRa network, forwards data from servers or terminals, and realizes data interaction between a terminal and a server. Apparently, a base station can also perform data interactions with other base stations that are located within a coverage scope of signals of the base station by transmitting wireless frames.

A server may include a single server or a server cluster, and is configured to perform service processing according to data obtained from a base station or a terminal, and to control a working mode and a working state of the base station or the terminal.

An actual transmission time length of a wireless frame is the processing time of the wireless frame when being sent by a base station, a time duration of sending the wireless frame, and the processing time of the wireless frame when being received by another base station. In the LoRa network, the accuracy of transmission of wireless frames is very high. Generally, an actual transmission time length taken for transmitting a wireless frame between base stations is related to a frame format of the wireless frame only. Therefore, for wireless frames of the same frame format, an actual transmission time length of these wireless frames is fixed.

A system time difference is a difference between system times of different base time stations.

Second data may include data from an intermediate terminal, such as uplink data. First data may include data sent to the terminal, such as downlink data. The downlink data may be obtained after a server performs service processing according to the uplink data.

For example, in an application of smart agriculture, a terminal may include multiple collection devices that are used for collecting environmental information such as temperature, humidity, and surrounding images, etc. Uplink data may include the collected environmental information, and downlink data may include control instructions, or other data, etc., for the collection devices based on the collected environmental information.

The embodiments of the present disclosure can be applied to data transmission in a LoRa network. In this LoRa network, when receiving uplink data of a terminal, a first base station usually determines a receiving time of receiving the uplink data, and sends the uplink data and the receiving time to a server. In response to receiving the uplink data and the receiving time, the server determines a second base station that sends downlink data to the terminal, and calculates a sending time for the second base station to send the downlink data to the terminal according to the receiving time. The second base station sends the downlink data to the terminal according to the sending time.

In order to avoid a higher data transmission cost that may be caused by the need of setting up additional global positioning systems, etc., to implement a synchronization of system times of various base stations, and thereby implement data transmission through the synchronized base stations, and to avoid of the issue of poor reliability of data transmission that is caused by unreliable synchronization of the system times based on the global positioning systems, a system time difference between a first base station receiving second data and a second base station transmitting first data may be determined based on an actual transmission time length of a wireless frame. When a system time difference between the two base stations transmitting the wireless frame exists, such system time difference will affect a measured sending time and/or a measured receiving time of the wireless frame, resulting in a measured transmission time length when the wireless frame is transmitted to be different from the actual transmission time length. For any wireless frame, an actual transmission time length of such wireless frame is fixed. Therefore, a system time difference between the first base station and the second base station can be determined based on the actual transmission time length of the wireless frame. After determining the system time difference, a sending time of sending the first data may be modified according to the system time difference, so as to ensure that the second base station can send the first data according to the modified sending time of the first data.

Since the sending time of sending the first data is modified according to the system time difference between the first base station receiving the second data and the second base station sending the first data in the above data transmission process, i.e., data transmission can be conducted in the LoRa network based on the system time difference between the base stations, system times of each base station do not need to be consistent. Apparently, each base station does not need to set up an additional global positioning system, which saves data transmission costs and avoids the problem of relatively poor reliability of data transmission caused by the inability of performing a synchronization of system times according to the global positioning systems, i.e., the reliability of data transmission is improved.

In order to balance the workloads of base stations and servers, and to make interactions between terminals, the base stations, and the servers to be more efficient, the above three steps, for example, determining a sending time of first data based on a receiving time of second data at a first base station, determining a system time difference between the first base station and a second base station based on an actual transmission time length of a wireless frame, and modifying a sending time of the first data according to the system time difference can be processed independently of each other. In other words, any one of the above three steps can be completed by any one of the first base station, the second base station, or a server.

Apparently, in real applications, each base station in the LoRa network may also be configured with a global positioning system, etc. In response to detecting a failure of the global positioning system or determining that the global positioning system cannot accept a positioning signal, data transmission is conducted using the data transmission method provided in the embodiments of the present disclosure.

First Embodiment

Referring to FIG. 1, a flowchart of a data transmission method 100 according to an embodiment of the present disclosure is shown. The data transmission method 100 may be used in a first base station, a second base station, or a server. In implementations, the data transmission method 100 may include the following operations.

S102: Determine a system time difference between a first base station and a second base station based on an actual transmission time length of a wireless frame.

In order to be able to modify the time when transmitting data through different base stations according to a system time difference between base stations in subsequent steps, thereby avoiding problems such as a relatively high data transmission cost that may be caused by the need for performing a system time synchronization between base stations and an unreliable data transmission due to an unreliable system time synchronization, a system time difference between a first base station and a second base station can be determined.

The first base station may be any base station in a LoRa network, and can receive second data from a terminal and send the second data to a server. When receiving the second data, the server determines a base station that sends first data to the terminal in the LoRa network based on the second data, the first base station, or the terminal. In other words, the second base station is determined by the server.

For example, the server may store an association relationship between the terminal and the second base station in advance. Therefore, when receiving the second data, the corresponding base station is selected as the second base station according to the terminal sending the second data. Alternatively, the server stores an association relationship between the first base station and the second base station in advance. As such, when receiving the second data, the corresponding base station is selected as the second base station according to the first base station.

In a LoRa network, if a base station transmits a wireless frame with another base station, the base station sending the wireless frame can determine a sending time stamp of the wireless frame according to the system time of the base station. The sending time stamp can show a sending time of the wireless frame. When receiving the wireless frame, the base station receiving the wireless frame can determine a receiving time stamp of the wireless frame according to the system time of that base station, and the receiving time stamp is used to describe a receiving time of the wireless frame. In other words, a base station can determine sending time or a receiving time of a wireless frame by determining a timestamp. In addition, in the LoRa network, the accuracy of determining a time stamp by a base station is very high, which can usually reach an order of microseconds. Therefore, a sending time and a receiving time of a wireless frame can be accurately determined using time stamps, and a difference between the sending time and the receiving time is a measured transmission time length of the wireless frame. If the measured transmission time length is the same as the actual transmission time length, the system time difference between the first base station and the second base station is zero, i.e., the system time of the first base station is synchronized with the system time of the second base station. If the measured transmission time length is different from the actual transmission time length, this means that the system time difference between the first base station and the second base station is not zero, and the difference between the measured transmission time length and the actual transmission time length is the system time difference.

In another exemplary embodiment, the system time of the first base station and the system time of the second base station can also be obtained at the same moment, and the system time difference between the first base station and the second base station can be calculated based on a difference between the system time of the first base station and the system time of the second base station at that moment. The same moment may be any time of the first base station, the second base station, or another device. However, due to reasons such as the time consumption for a data interaction between base stations, it may actually be difficult to obtain the system time of the first base station and the system time of the second base station at that moment at the same time, and thus it is difficult to determine the system time difference between the first base station and the second base station. Therefore, relevant technical personnel can select a clock reference device with a relatively high accuracy, such as a cesium atomic clock, to detect and store a respective difference between the system time of each base station and the time of the clock reference device. Subsequently, the system time difference the first base station and the second base station is calculated based on a difference between the system time of the first base station and the time of the clock reference device, and a difference between the system time of the second base station and the time of the clock reference device.

Methods of calculating a difference between the system time of each base station and the time of the clock reference device may be the same, for example, being obtained by subtracting the time of the clock reference device from the system time of the base station.

If the difference between the system time of the second base station and the time of the clock reference device is subtracted by the difference between the system time of the first base station and the time of the clock reference device, a value that is obtained is treated as the system time difference. When the system time difference is greater than zero, this means that the system time of the second base station is ahead of the system time of the first base station. When the system time difference is less than zero, this means that the system time of the second base station lags behind the system time of the first base station. If the difference between the system time of the first base station and the time of the clock reference device is subtracted by the difference between the system time of the second base station and the time of the clock reference device, a value that is obtained is treated as the system time difference. When the system time difference is greater than zero, the system time of the first base station is ahead of the system time of the second base station. When the system time difference is less than zero, the system time of the first base station lags behind the system time of the second base station.

$\Delta t = t_2 - t_1$ may represent the system time difference between the first base station and the second base station. $\Delta t$ represents the system time difference. When $\Delta t$ is greater than zero, this indicates that the system time of the second base station is ahead of the system time of the first base station. When $\Delta t$ is less than zero, this indicates the system time of the second base station lags behind the system time of the first base station. Alternatively, $\Delta t = t_1 - t_2$ may represent the system time difference between the first base station and the second base station. When $\Delta t$ is greater than zero, this indicates that the system time of the first base station lags behind the system time of the second base station. $t_1$ represents the difference between the system time of the first base station and the time of the clock reference device, and $t_2$ represents the difference between the system time of the second base station and the time of the clock reference device.

For example, the stored differences between the system time of each base station and the time of the clock reference device are shown in Table 1 below. The difference between the system time of the base station 1 and the time of the clock reference device is 5 microseconds. The difference between the system time of the base station 2 and the time of the clock reference device is 10 microseconds. The difference between the system time of the base station 3 and the time of the clock reference device is 3 microseconds. Therefore, the base station 1 and the base station 2 are taken as an example. The base station 1 acts as the first base station, and the base station 2 acts as the second base station. The system time difference between the first base station and the second base station may be 10−5=5 microseconds, and 5 is greater than 0. In other words, the system time of the second base station is ahead of the system time of the first base station by 5 microseconds.

TABLE 1

| Base station | Difference (unit: microsecond) |
| --- | --- |
| Base station 1 | 5 |
| Base station 2 | 10 |
| Base station 3 | 3 |
| . . . | . . . |

Applying the data transmission method in the second base station is taken as an example. The second base station can obtain a base station identifier of the first base station from the server, and find the difference between the system time of the first base station and the time of the clock reference device according to the base station identifier of the first base station.

The server may send the base station identifier of the first base station to the second base station when determining that the second base station is used for sending the first data, thereby notifying the second base station of the first base station.

A base station identifier is used for uniquely identifying a base station in the LoRa network, and may include a serial number, a name, etc., of the base station.

S104: Modify a sending time of first data according to the system time difference, the sending time of the first data being determined according to a receiving time of second data at the first base station.

Since the system time difference can indicate that the system time of the second base station is ahead of the system time of the first base station, or lags behind the system time of the first base station, a sending time for sending first data can be modified according to the system time difference to ensure that the first data can also be sent accurately, when the system times of the first base station and the second base station are not synchronized, thus improving the reliability of data transmission.

The first data may be obtained after service processing is performed by at least one of the server or the terminal that sends second data according to the second data.

When the data transmission method is applied in a server, the server may obtain a receiving time for receiving second data from the first base station, and determine a sending time of first data according to a receiving time of the second data. When the data transmission method is applied in the second base station, the sending time of the first data may be obtained from the server. For example, after determining the sending time of the first data, the server sends the sending time of the first data to the second base station.

The receiving time of the second data may be added with a preset time length to obtain the sending time of the first data. Apparently, in practical applications, the sending time of the first data can also be determined according to the receiving time of the second data by other methods. For example, the sending time of the first data is calculated and obtained from the receiving time of the second data using a preset algorithm.

The sending time of the first data is determined based on the receiving time of the second data at the first base station, i.e., the sending time of the first data is obtained based on the system time of the first base station. Therefore, if the system time of the second base station is ahead of the system time of the first base station, the sending time of the first data can be added with the amount of time that the second base station is ahead of the system time of the first base station. If the system time of the second base station lags behind the system time of the first base station, the sending time of the first data is subtracted by the amount of time that the second base station lags behind the system time of the first base station. As such, the sending time of the first data that is determined based on the system time of the first base station is modified. The modified sending time of the first data is the system time of the second base station when the second base station sends the first data.

If $\Delta t = t_1 - t_2$, the modified sending time of the first data may be expressed as: $t'_1 = t'_2 - \Delta t$. If $\Delta t = t_2 - t_1$, $t'_1 = t'_2 + \Delta t$. $t'_2$ represents the sending time of the first data, and $t'_1$ represents the modified sending time of the first data.

The foregoing description uses an example that the second base station modifies a sending time of first data sent by the second base station based on $\Delta t$ that is obtained from calculation. In practical applications, if the first base station modifies a sending time of first data sent by the first base station according to $\Delta t$, then $t'_1 = t'_2 + \Delta t$ if $\Delta t = t_1 - t_2$, and $t'_1 = t'_2 - \Delta t$ if $\Delta t = t_2 - t_1$.

S106: Send the first data from the second base station according to the modified sending time of the first data.

Since the sending time of the first data has been modified, the first data can be sent to a terminal according to the modified sending time of the first data, in order to avoid a problem that the terminal has the difficulty of receiving the first data due to the system time difference between the second base station and the first base station.

When the data transmission method is applied in a server, the server sends the modified sending time of the first data to the second base station, so that the second base station sends the first data to a terminal (i.e., a terminal that sends the second data) according to the received time.

Apparently, the server may also send the second data that is sent to the terminal and a terminal identifier of the terminal to the second base station.

A terminal identifier is used for uniquely identifying a terminal in the LoRa network, such as a serial number, or a name, etc., of the terminal.

When the data transmission method is applied in the first base station, the first base station may notify the second base station of the modified sending time of the first data through a server, so that the second base station sends the first data according to the modified sending time of the first data.

In the embodiments of the present disclosure, a system time difference between a first base station and a second base station can be determined based on an actual transmission time length of a wireless frame. Therefore, when a sending time of first data is determined according to a receiving time of second data that is received by the first base station, the sending time of the first data can be modified according to the system time difference, and the first data is sent from the second base station at the modified sending time of the first data. Since a process of data transmission does not need to rely on a synchronization of system times of each base station, the problem of rising data transmission costs that may be caused by a global positioning system of each base station can be avoided, and the problem of difficulty of conducting reliable data transmission caused by the inability of each base station to accurately receive positioning signals can be alleviated. In other words, the data transmission cost is reduced, and the reliability of data transmission is improved.

Second Embodiment

Figure 2A:
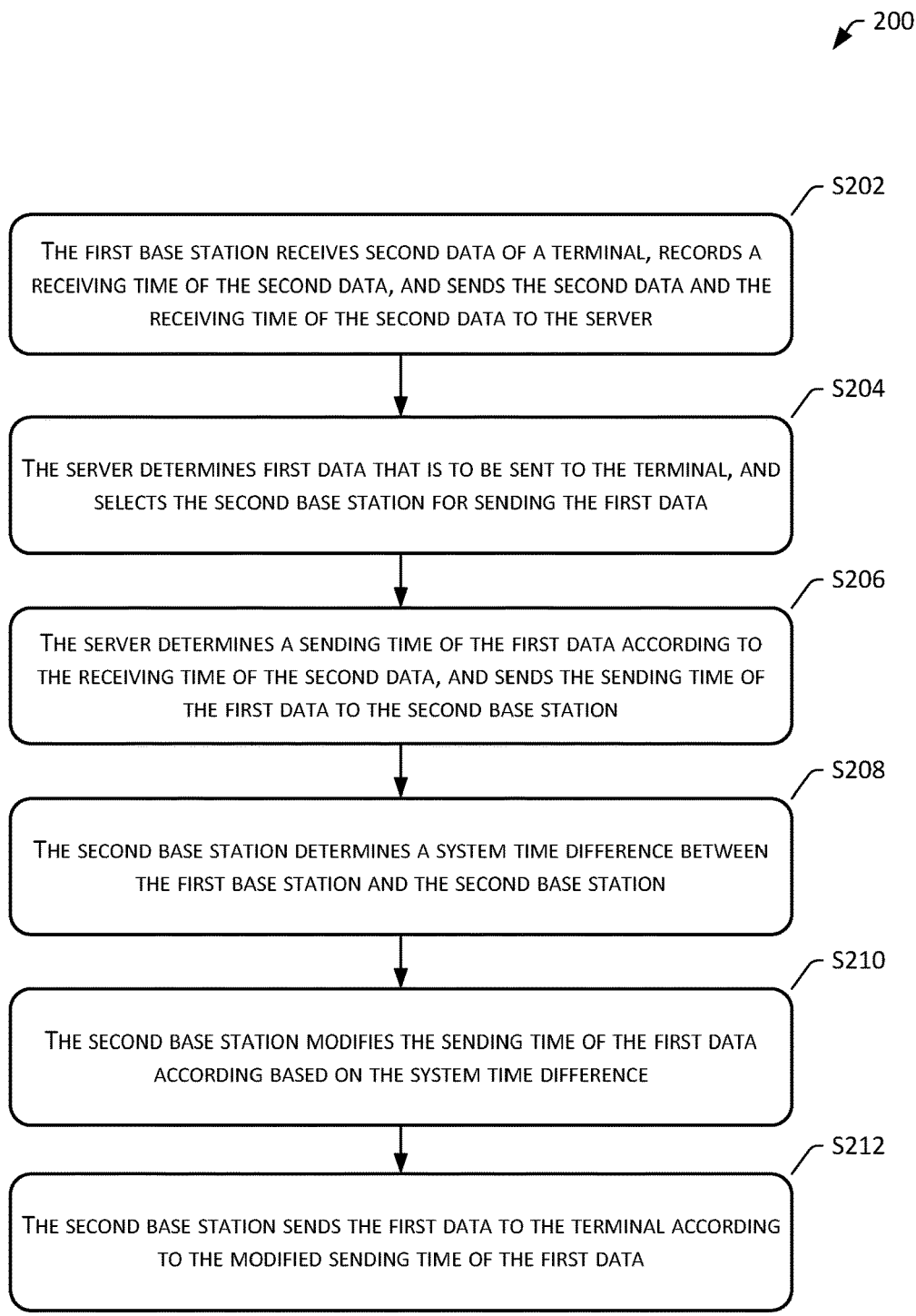
FIGS. 2A and 2B show a flowchart of a data transmission method according to a second embodiment of the present disclosure.

Referring to FIG. 2A, a flowchart of a data transmission method 200 according to an embodiment of the present disclosure is shown. The data transmission method 200 is applied in interactions between a first base station, a second base station, and a server. In implementations, the data transmission method 200 may include the following operations.

S202: The first base station receives second data of a terminal, records a receiving time of the second data, and sends the second data and the receiving time of the second data to the server.

In order to enable interactions between a terminal and a server, a first base station may obtain second data from the terminal, and send the second data to the server. Furthermore, in order to ensure that first data is accurately sent to the terminal according to a receiving time of receiving second data and the first base station is able to receive the first data in subsequent steps, the first base station can send the receiving time of the second data to the server.

The first base station may determine the system time of the first base station when the second data is received as the receiving time of the second data, for example, determining a receiving timestamp of receiving the second data.

S204: The server determines first data that is to be sent to the terminal, and selects the second base station for sending the first data.

In order to accurately return the first data to the terminal that sends the second data to complete the interaction with the terminal or to perform service processing for the terminal, the server may select a second base station for sending the first data.

A method of selecting a second base station by the server can be referenced to a related description in the foregoing text, and details thereof are not redundantly described herein.

S206: The server determines a sending time of the first data according to the receiving time of the second data, and sends the sending time of the first data to the second base station.

A method of determining the sending time of the first data by the server according to the receiving time of the second data can be referenced to a related description in the foregoing text, and details thereof are not redundantly described herein.

For example, the receiving time of the second data is 1444444452810 microseconds, and the server adds 3 seconds to 1444444452810 microseconds to obtain the sending time of the first data as 1444447452810 microseconds.

S208: The second base station determines a system time difference between the first base station and the second base station.

In the embodiments of the present disclosure, preferably, as can be known from the foregoing, an actual transmission time length of a wireless frame transmitted between the first base station and the second base station is fixed. If a system time difference exists between the first base station and the second base station, a measured transmission time length of the wireless frame is not equal to the actual transmission time length. Therefore, a system time difference between the first base station and the second base station can be calculated quickly and accurately according to a process of transmitting the wireless frame between the first base station and the second base station, thereby ensuring that the sending time of the first data sent by the second base station is modified to improve the reliability of data transmission. The second base station may set the difference between the measured transmission time length (that is taken by the wireless frame from being sent by the first base station to being received by the second base station) and the actual transmission time length as the system difference between the first base station and the second base station.

Sending from the first base station to the second base station is used as an example. A wireless frame may be sent by the first base station to the second base station separately or by broadcasting. The wireless frame may carry a sending time for sending the wireless frame. For example, the wireless frame may include a sending timestamp for sending the wireless frame.

Figure 2B:
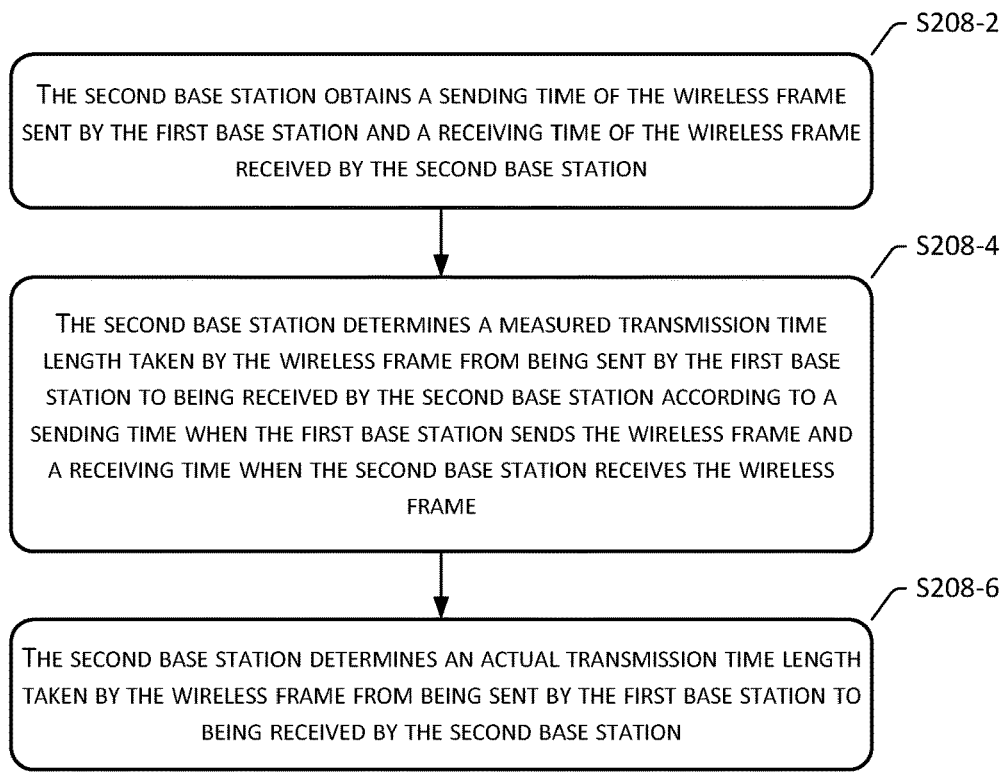

The second base station may determine a difference between a measured transmission time length (that is taken by the wireless frame from being sent by the first base station to being received by the second base station) and an actual transmission time length as a system time difference between the first base station and the second base station as shown in FIG. 2B:

Sub-step 208-2: The second base station obtains a sending time of the wireless frame sent by the first base station and a receiving time of the wireless frame received by the second base station.

The first base station may send a wireless frame to the second base station, including sending the wireless frame to the second base station periodically, or sending the wireless frame when receiving a request for sending the wireless frame from the server, to enable the second base station to determines a sending time of the wireless frame. A strategy for the first base station to send the wireless frame to the second base station may be determined by the server. The server may send a control request for the wireless frame to the first base station to instruct the first base station about a strategy of sending the wireless frame to the second base station through the control request for the wireless frame.

A request for sending a wireless frame is used to instruct the first base station to immediately send the wireless frame to the second base station, and the request for sending the wireless frame may carry a base station identifier of the second base station.

In the embodiments of the present disclosure, preferably, if the first base station sends a wireless frame when receiving a request for sending the wireless frame from the server, the first base station may receive the second data of the terminal before sending the wireless frame.

A control request for a wireless frame is used to instruct the first base station to send a strategy of sending the wireless frame to the second base station, for example, whether sending is performed regularly, a time interval of sending the wireless frame when sending is performed regularly, whether sending is performed by broadcasting, a frame format of the wireless frame, etc.

In the embodiments of the present disclosure, preferably, in order to ensure that the second base station can receive a wireless frame sent by the first base station, to ensure that the second base station can obtain a system time difference from the first base station, and thereby to ensure a reliable transmission of first data, the first base station may determine the second base station selected by the server for sending the first data. For example, the server may notify the first base station of the second base station when determining the second base station.

Sub-step 208-4: The second base station determines a measured transmission time length taken by the wireless frame from being sent by the first base station to being received by the second base station according to a sending time when the first base station sends the wireless frame and a receiving time when the second base station receives the wireless frame.

A difference between a receiving time of a wireless frame and a sending time of the wireless frame can be treated as a measured transmission time length taken by the wireless frame from being sent by the first base station to being received by the second base station.

For example, the second base station determines that a sending time of a wireless frame 1 is 14444440000000 microseconds according to a sending timestamp carried by the wireless frame 1. In response to receiving the wireless frame 1, the second base station determines a receiving timestamp of the wireless frame 1. A receiving time of the wireless frame 1 is 1444448000000 microseconds. A measured transmission time length of the wireless frame 1 is then 1444448000000−1444440000000=8000000 microseconds.

Sub-step 208-6: The second base station determines an actual transmission time length taken by the wireless frame from being sent by the first base station to being received by the second base station.

An actual transmission time length corresponding to the wireless frame may be determined in advance according to a frame format of the wireless frame. For example, the actual transmission time length corresponding to a frame format of the wireless frame is obtained from a correspondence relationship between the frame format and the actual transmission time length.

The correspondence relationship between the frame format and the actual transmission time length can be obtained by testing processes of transmission of wireless frames of different frame formats in advance, and storing actual transmission time lengths and corresponding frame formats that are obtained from the test.

In the embodiments of the present disclosure, preferably, in order to improve the accuracy of determining the actual transmission time length and the accuracy of determining the system time difference between the first base station and the second base station, a time length of a round trip between the first base station and the second base station for the wireless frame may be determined, and a half of the time length of the round trip is determined as the actual transmission time length.

Figure 3:
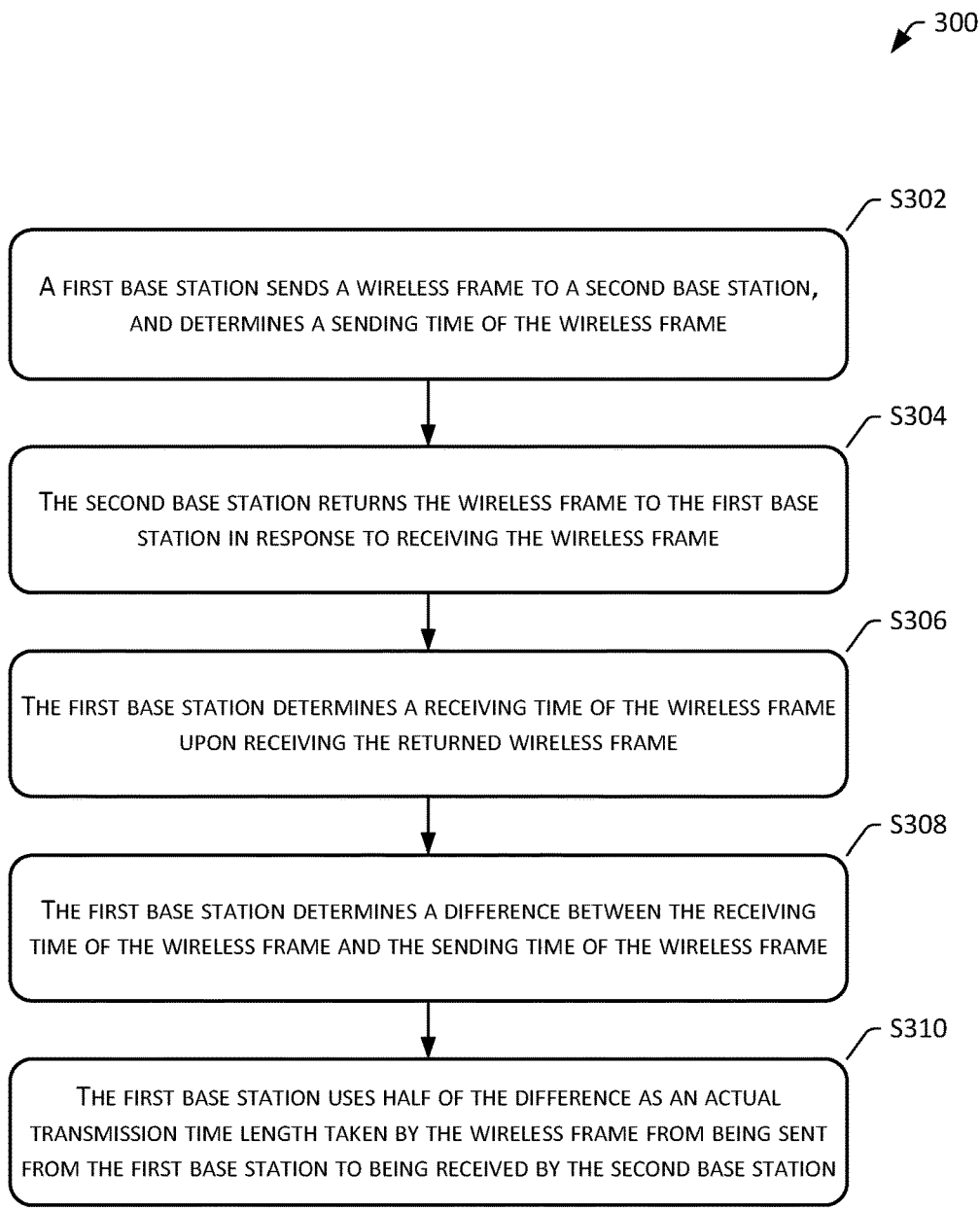
FIG. 3 shows a flowchart of a method for determining an actual transmission time length according to a second embodiment of the present disclosure.

FIG. 3 shows a flowchart of a method for determining an actual transmission time length according to a second embodiment of the present disclosure. Referring to FIG. 3, at S302, a first base station sends a wireless frame to a second base station, and determines a sending time of the wireless frame. At S304, the second base station returns the wireless frame to the first base station in response to receiving the wireless frame. At S306, the first base station determines a receiving time of the wireless frame upon receiving the returned wireless frame. Since the sending time of sending the wireless frame and the receiving time of receiving the returned wireless frame are both determined by the first base station according to the system time of the first base station, a difference between the receiving time of the wireless frame and the sending time of the wireless frame is not affected by a system time difference between different base stations. Therefore, at S308, the first base station determines a difference between the receiving time of the wireless frame and the sending time of the wireless frame, the difference being a time length of a round-trip between the first base station and the second base station for the wireless frame. At S310, the first base station uses half of the difference as an actual transmission time length taken by the wireless frame from being sent from the first base station to being received by the second base station.

For example, the first base station will send a wireless frame 1 to the second base station, and determines that a sending time of the wireless frame 1 is 1444400000000 microseconds when the wireless frame 1 is sent. The second base station returns the wireless frame 1 to the first base station after receiving the wireless frame 1. The first base station determines a receiving time of the wireless frame 1 to be 1444400020000 microseconds when receiving the wireless frame 1. A time length of a round trip between the first base station and the second base station for the wireless frame 1 is 1444400020000−11444400000000=20000 microseconds, so an actual transmission time length for wireless frame 1 is 20000/2=10000 microseconds.

Apparently, in practical applications, due to reasons such as busyness of the second base station, etc., the wireless frame may not be returned to the first base station immediately when the wireless frame of the first base station is received, and the wireless frame may be returned to the first base station after a specific time period of delay. Therefore, when returning the wireless frame, the second base station may also notify the first base station of such specific time period, so that the first base station subtracts the specific time period from the time length of the round-trip, and half of the time length that is obtained is the actual transmission time length taken by the wireless frame from being sent by the first base station to being received by the second base station.

Sub-step 2044: Use a difference between the determined measured transmission time length and the actual transmission time length as a system time difference between the first base station and the second base station.

Figure 4:
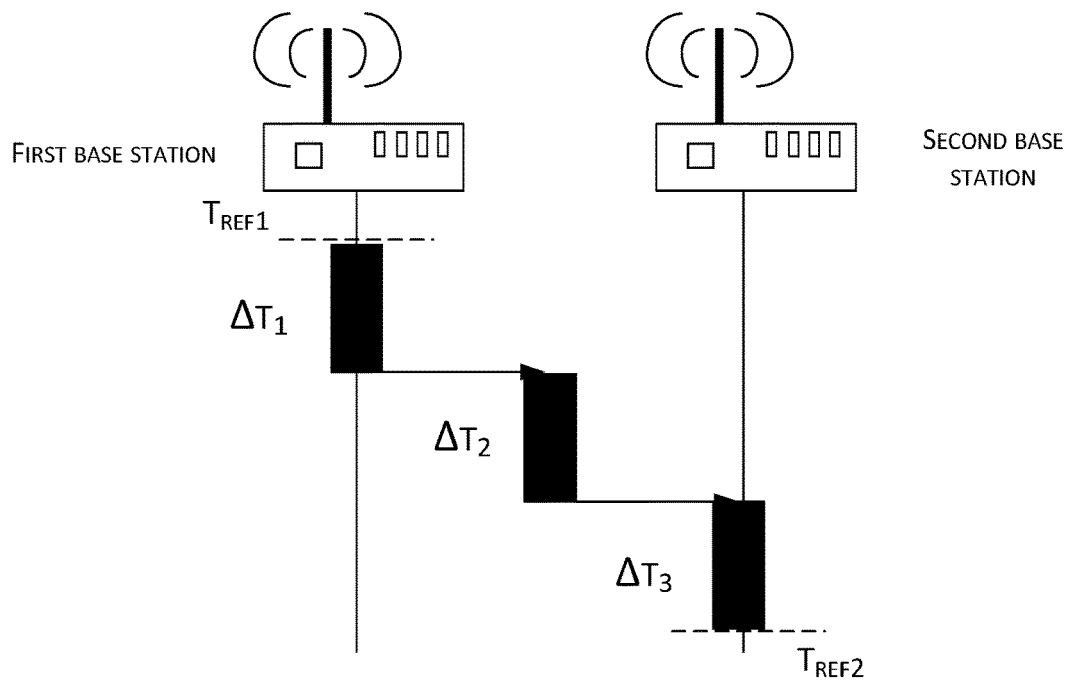
FIG. 4 shows a schematic diagram of a wireless frame transmission according to the second embodiment of the present disclosure.

For example, a process 400 of sending a wireless frame from a first base station to a second base station may be as shown in FIG. 4. $t_{ref1}$ represents a sending time of sending the wireless frame by the first base station, i.e., the system time of the first base station when the first base station sends the wireless frame. $t_{ref2}$ represents a receiving time of receiving the wireless frame by the second base station, i.e., the system time of the second base station when the second base station receives the wireless frame. $\Delta t_1$ represents the processing time of the wireless frame when being sent by the first base station, such as the time taken for modulation. $\Delta t_2$ represents the time duration of the wireless frame sent from the first base station to the second base station. $\Delta t_3$ represents the processing time of the wireless frame when being received by the second base station, such as the time taken for demodulation. Therefore, $\Delta t_{ref}=|t_{ref2}-t_{ref1}|$, where $\Delta t_{ref}$ represents a measured transmission time length taken by the wireless frame from being sent by the first base station to being received by the second base station. $\Delta T=\Delta t_1+\Delta t_2+\Delta t_3$ represents an actual transmission time length taken by the wireless frame from being sent by the first base station to being received by the second base station.

$$\Delta t = \frac{t_{ref2} - t_{ref1}}{\Delta t_{ref}}(\Delta t_{ref} - \Delta T) \text{ or } \Delta t = \frac{t_{ref1} - t_{ref2}}{\Delta t_{ref}}(\Delta t_{ref} - \Delta T)$$

represents a system time difference between the first base station and the second base station. If $$\Delta t = \frac{t_{ref2} - t_{ref1}}{\Delta t_{ref}}(\Delta t_{ref} - \Delta T),$$

this indicates that the system time of the second base station is ahead of the system time of the first base station when $\Delta t$ is less than 0, and the system time of the second base station lags behind the system time of the first base station when $\Delta t$ is greater than 0. If $$\Delta t = \frac{t_{ref1} - t_{ref2}}{\Delta t_{ref}}(\Delta t_{ref} - \Delta T),$$

this indicates that the system time of the first base station is ahead of the system time of the second base station when $\Delta t$ is greater than 0, and the system time of the first base station lags behind the system time of the second base station when $\Delta t$ is less than 0.

$$\Delta t = \frac{t_{ref2} - t_{ref1}}{\Delta t_{ref}}(\Delta t_{ref} - \Delta T)$$

is used as an example for representing the system time difference between the first base station and the second base station. ΔT=3 microseconds. For the wireless frame 1, the sending time $t_{ref1}$=1444440000000 microseconds, the receiving time $t_{ref2}$=1444444800000 microseconds, and $\Delta t_{ref}$=1444444800000−1444440000000=800000 microseconds.

$$\Delta t = \frac{1444444800000 - 444440000000}{800000}(800000 - 10000),$$

i.e., Δt=7990000 microseconds.

In the embodiments of the present disclosure, preferably, if a wireless frame is sent from the second base station to the first base station, the second base station may determine a sending time of the wireless frame when the wireless frame is sent, obtain a receiving time when the wireless frame is received by the first base station from the first base station through the server, and calculate a system time difference between the first base station and the second base station based on the sending time and the receiving time of the wireless frame.

In $$\Delta t = \frac{t_{ref_1} - t_{ref_2}}{\Delta t_{ref}}(\Delta t_{ref} - \Delta T),$$

$t_{ref2}$ represents a sending time of a wireless frame sent by the second base station, i.e., the system time of the second base station when the second base station sends the wireless frame. $t_{ref1}$ represents a receiving time when the first base station receives the wireless frame, i.e., the system time of the first base station when the first base station receives the wireless frame. When Δt is greater than 0, the system time of the first base station is ahead of the system time of the second base station. When Δt is less than 0, the system time of the first base station lags behind the system time of the second base station.

In the embodiments of the present disclosure, preferably, in order to improve the reliability of determining a system time difference between a first base station and a second base station, and further improve the reliability of data transmission in a LoRa network, a wireless frame acts as reference time information, and the reference time information carries a sending time of the reference time information.

The reference time information may only be used in calculation of a system time difference between the first base station and the second base station.

The first base station sends the reference time information to the second base station. The second base station may obtain a sending time at which the first base station sends the reference time information and a receiving time at which the second base station receives the reference time information, determine the measured transmission time length according to the sending time when the reference time information is sent and the receiving time when the reference time information is received, and use a difference between the measured transmission time length and the actual transmission time length as the system time difference between the first base station and the second base station.

In the embodiments of the present disclosure, preferably, since the server may send first data to multiple terminals at the same time, the first base station may send the reference time information to at least one base station within the same communication area, in order to ensure that each terminal can receive the first data and to improve the reliability of data transmission.

The same communication area may include at least one range of coverage of signals of the first base station.

Figure 5:
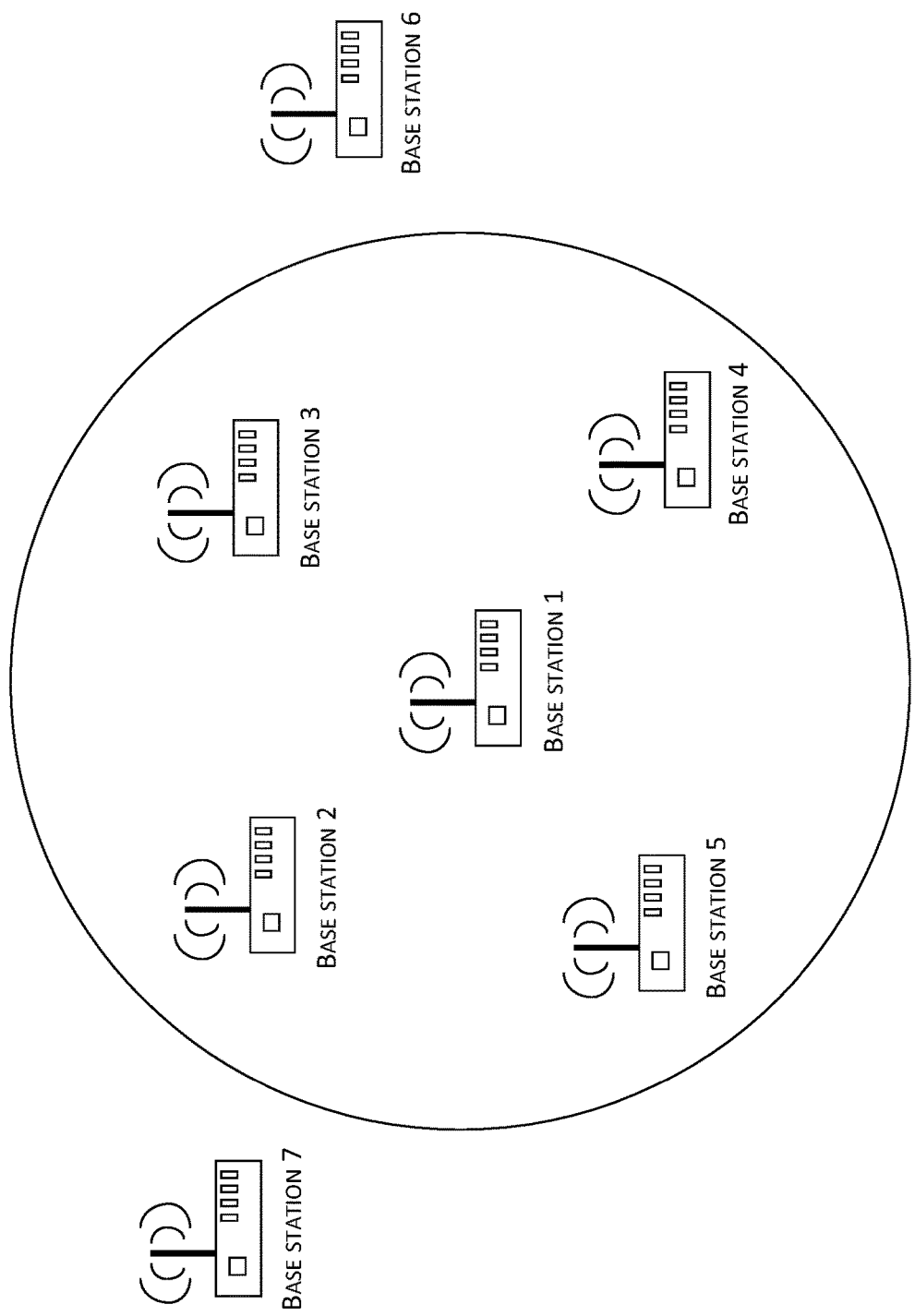
FIG. 5 shows a schematic diagram of a base station according to the second embodiment of the present disclosure.

For example, as shown in FIG. 5, a range of coverage of signals of the base station 1 is a circular area centered at the base station 1. The circular area includes the base station 2, the base station 3, the base station 4, and the base station 5. The base station 6 and the base station 7 are located outside the circular area. Therefore, the base station 1 can send the reference time information by broadcasting to the base station 2, the base station 3, the base station 4, and the base station 5 in the circular area.

In the embodiments of the present disclosure, preferably, in order to reduce the pressure on the second base station, to reduce the possibility of congestion of data from the terminal, the server, and other base stations at the second base station, and to improve the reliability of data transmission, the second base station may send a sending time when a wireless frame is sent by the first base station and a receiving time when the wireless frame is received by the second base station to the server. The server determines a system difference between the first base station and the second base station based on the sending time and the receiving time of the wireless frame, and sends the system time difference to the second base station. Therefore, the second base station can receive the system time difference between the first base station and the second base station sent by the server.

The second base station may store the system time difference as a system time difference associated with the first base station. Therefore, when the second base station may obtain the system time difference associated with the first base station when obtaining the system time difference with the first base station.

An existence of a clock difference between clocks of base stations may causes errors in the clocks of the base stations to accumulate over time. In order to improve the accuracy of determining a system time difference between the first base station and the second base station and to ensure the reliability of data transmission, a system time difference can be calculated based on a measured transmission time length and an actual transmission time length of a wireless frame as described above by sending and receiving the wireless frame on a regular basis.

S210: The second base station modifies the sending time of the first data according based on the system time difference.

In order to reduce the pressure on the server, to reduce the possibility of unreliable data transmission due to an excessive server load, and to improve the reliability of data transmission, the sending time of the first data sent by the second base station may be modified by the second base station.

If $$\Delta t = \frac{t_{ref_2} - t_{ref_1}}{\Delta t_{ref}}(\Delta t_{ref} - \Delta T),$$

then $t'_1 = t'_2 + \Delta t$. If $$\Delta t = \frac{t_{ref_1} - t_{ref_2}}{\Delta t_{ref}}(\Delta t_{ref} - \Delta T),$$

then $t'_1=t'_2-\Delta t$.

For example, $\Delta t=7990000$ microseconds is obtained from $$\Delta t = \frac{t_{ref_2} - t_{ref_1}}{\Delta t_{ref}}(\Delta t_{ref} - \Delta T)$$

in the foregoing description. A sending time of first data is 1444447452810 microseconds, i.e., $t'_2=1444447452810$ microseconds, and then $t'_1=1444447452810+7990000$, i.e., $t'_1=1444455442810$ microseconds. In this case, the second base station sends the first data when the system time of the second base station is 1444444452819 microseconds.

Apparently, if the first base station modifies the sending time of the first data sent by the first base station according to $\Delta t$, then $t'_1=t'_2-\Delta t$ when $$\Delta t = \frac{t_{ref_2} - t_{ref_1}}{\Delta t_{ref}}(\Delta t_{ref} - \Delta T),$$

and $t'_1=t'_2+\Delta t$ when $$\Delta t = \frac{t_{ref_1} - t_{ref_2}}{\Delta t_{ref}}(\Delta t_{ref} - \Delta T).$$

S212: The second base station sends the first data to the terminal according to the modified sending time of the first data.

A method of sending the first data by the second base station according to the modified sending time of the first data may be referenced to a related description in the foregoing text, and details thereof are not described herein.

In the embodiments of the present disclosure, first, the system time difference between the first base station and the second base station can be determined based on the actual transmission time length of the wireless frame. Therefore, when the sending time of the first data based on the receiving time of the second data that is received, the sending time of the first data can be modified according to the system time difference, and the first data is sent from the second base station at the modified sending time of the first data. Since such process of data transmission does not need to rely on a synchronization of system times of each base station, this not only avoids the problem of rising data transmission costs that may be caused by global positioning systems of each base station, but also alleviates the problem of difficulty of reliably performing data transmission caused by the inability of each base station to accurately receive positioning signals. In other words, the data transmission cost is reduced, and the reliability of data transmission is improved.

Second, since a wireless frame is sent by the first base station to the second base station, a difference between a measured transmission time length and an actual transmission time length taken by the wireless frame from being sent by the first base station to being received by the second base station can be used as a system time difference between the first base station and the second base station. In other words, the system time difference between the first base station and the second base station can be calculated based on a sending time of the wireless frame sent by the first base station and a receiving time of the wireless frame received by the second base station, thus ensuring that a sending time of first data by the second base station can be modified, and thereby improving the reliability of data transmission.

In addition, the wireless frame may be reference time information, and the reference time information may be dedicated for determination of the system time difference between the first base station and the second base station, further improving the reliability of determining the system time difference between the first base station and the second base station.

In addition, the second base station calculates the system time difference between the first base station and the second base station, and modifies the sending time of sending the first data based on the system time difference, which reduces the pressure on the server and reduces the possibility of failing to reliably transmit data due to the excessive server load, i.e., improving the reliability of data transmission.

In addition, the server can calculate the system time difference between the first base station and the second base station, and send the system time difference to the second base station, so that the second base station can modify the sending time for sending the first data according to the system time difference, which reduces the pressure of the second base station, reduces the possibility of congestion of data from the terminal, the server, and other base stations at the second base station, and improves the reliability of data transmission.

Third Embodiment

Figure 6:
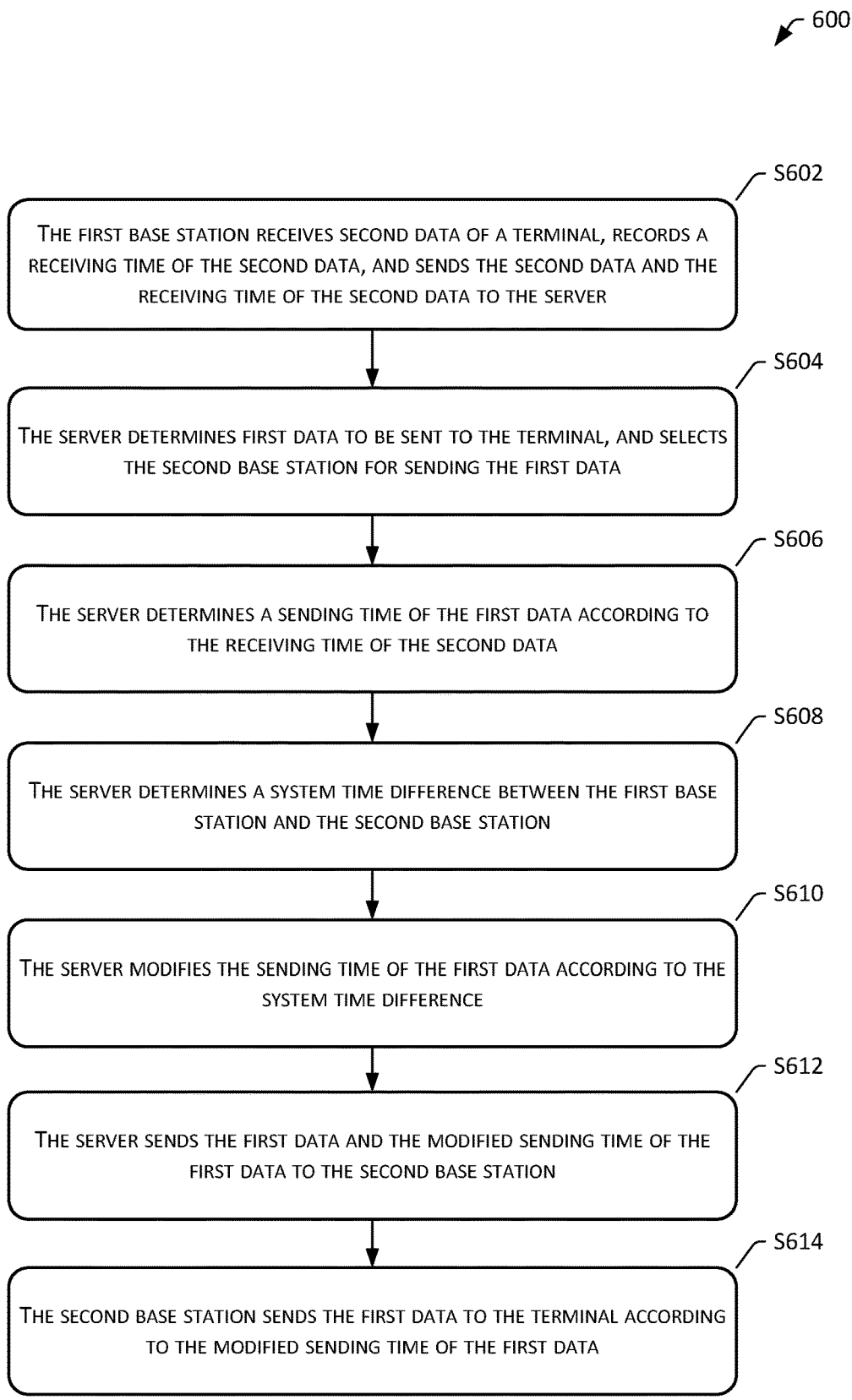
FIG. 6 shows a flowchart of a data transmission method according to a third embodiment of the present disclosure.

Referring to FIG. 6, a flowchart of a data transmission method 600 according to an embodiment of the present disclosure is shown. The data transmission method 600 is applied to interactions between a first base station, a second base station, and a server. In implementations, the data transmission method 600 may include the following operations.

S602: The first base station receives second data of a terminal, records a receiving time of the second data, and sends the second data and the receiving time of the second data to the server.

A manner in which the first base station receives the second data of the terminal, records the receiving time of the second data, and sends the second data and the receiving time of the second data to the server can be referenced to a related description in the foregoing text, and details thereof are not redundantly described herein.

S604: The server determines first data to be sent to the terminal, and selects the second base station for sending the first data.

A manner in which the server determines the first data sent to the terminal and selects the second base station for sending the first data can be referenced to a related description in the foregoing text, and details thereof are not redundantly described herein.

S606: The server determines a sending time of the first data according to the receiving time of the second data.

A manner in which the server determines the sending time of the first data according to the receiving time of the second data can be referenced to a related description in the foregoing text, and details thereof are not redundantly described herein.

S608: The server determines a system time difference between the first base station and the second base station.

The server may obtain a system time difference between the first base station and the second base station from the second base station. For example, after calculating the system time difference between the first base station and the second base station, the second base station sends the system time difference to the server. Alternatively, the server may obtain a sending time of the wireless frame sent by the first base station and a receiving time of the wireless frame received by the second base station from the second base station, and thereby determines a difference between a measured transmission time length and an actual transmission time length taken by the wireless frame from being sent by the first base station to being received by the second base station as the system time difference between the first base station and the second base station.

Apparently, in practical applications, the server may also obtain the system time difference between the first base station and the second base station from the first base station. If a wireless frame is sent by the first base station to the second base station, the first base station can obtain a receiving time of the wireless frame received by the second base station from the second base station through the server. With reference to a related description in the foregoing text, the system time difference between the first base station and the second base station is calculated based on the sending time and the receiving time of the wireless frame.

S610: The server modifies the sending time of the first data according to the system time difference.

In order to reduce the pressure on the second base station, to reduce the possibility of congestion of data from the terminal, the server, and other base stations at the second base station, and to improve the reliability of data transmission, the server can modify the sending time of the first data.

A manner in which the server modifies the sending time of the first data according to the system time difference can be referenced to a related description in the foregoing text, and details thereof are not redundantly described herein.

S612: The server sends the first data and the modified sending time of the first data to the second base station.

S614: The second base station sends the first data to the terminal according to the modified sending time of the first data.

In the embodiments of the present disclosure, firstly a system time difference between the base station and the second base station can first be determined based on an actual transmission time length of a wireless frame. Therefore, when a sending time of first data is determined based on a receiving time of second data, the sending time of the first data can be modified according to the system time difference, and the first data is sent from the second base station at the modified sending time of the first data. Since such process of data transmission does not need to rely on a synchronization of system times of each base station, this not only avoids the problem of rising data transmission costs that may be caused by global positioning systems of each base station, but also alleviates the problem of difficulty of reliably performing data transmission caused by the inability of each base station to accurately receive positioning signals. In other words, the data transmission cost is reduced, and the reliability of data transmission is improved.

Secondly, the server calculates a sending time of first data according to a receiving time of second data, determines a system time difference between the first base station and the second base station, and modifies the sending time of the first data according to the system time difference, further reducing the pressure of the base station, reducing the possibility of congestion of data from the terminal, the server, and other base stations at the second base station, and improving the reliability of data transmission.

Fourth Embodiment

Figure 7:
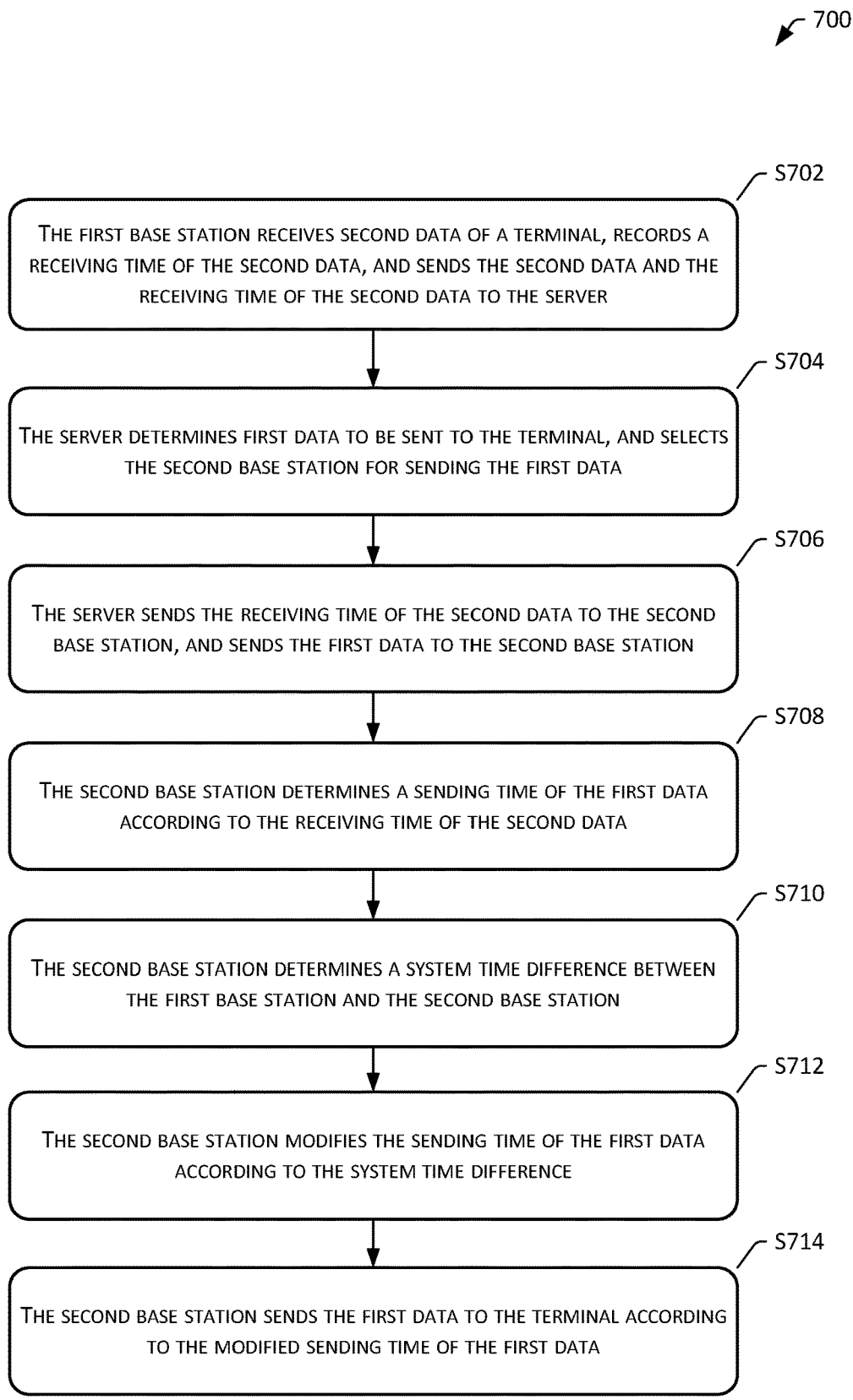
FIG. 7 shows a flowchart of a data transmission method according to a fourth embodiment of the present disclosure.

Referring to FIG. 7, a flowchart of a data transmission method 700 according to an embodiment of the present disclosure is shown. The data transmission method 700 is applied to interactions between a first base station, a second base station, and a server. In implementations, the data transmission method 700 may include the following operations.

S702: The first base station receives second data of a terminal, records a receiving time of the second data, and sends the second data and the receiving time of the second data to the server.

A manner in which the first base station receives the second data of the terminal, records the receiving time of the second data, and sends the second data and the receiving time of the second data to the server can be referenced to a related description in the foregoing text, and details thereof are not redundantly described herein.

S704: The server determines first data to be sent to the terminal, and selects the second base station for sending the first data.

A manner in which the server determines the first data sent to the terminal and selects the second base station for sending the first data can be referenced to a related description in the foregoing text, and details thereof are not redundantly described herein.

S706: The server sends the receiving time of the second data to the second base station, and sends the first data to the second base station.

In order to facilitate the following steps in which the second base station accurately calculates a sending time of sending the first data based on the receiving time of the second data, and modifies the calculated sending time based on a system time difference between the first base station and the second base station to reduce the pressure on the server and thus to enable the server to provide services for more terminals (i.e., improving the reliability of data transmission in a LoRa network), the server can send the receiving time of the second data to the second base station. Correspondingly, the second base station may receive the receiving time of the second data notified by the first base station.

Apparently, the server may also determine the first data when receiving the second data, and send the first data to the second base station.

A manner in which the server determines the first data can be referenced to a related description in the foregoing text, and details thereof are not redundantly described herein.

S708: The second base station determines a sending time of the first data according to the receiving time of the second data.

A manner in which the second base station determines the sending time of the first data according to the receiving time of the second data can be referenced to a related description in the foregoing text, and details thereof are not redundantly described herein.

S710: The second base station determines a system time difference between the first base station and the second base station.

A manner in which the second base station determines the system time difference between the first base station and the second base station can be referenced to a related description in the foregoing text, and details thereof are not redundantly described herein.

S712: The second base station modifies the sending time of the first data according to the system time difference.

In order to reduce the pressure on the server, to reduce the possibility that data cannot be reliably transmitted due to excessive server load, and to improve the reliability of data transmission, the second base station may modify the sending time of the first data.

A manner in which the second base station modifies the sending time of the first data according to the system time difference can be referenced to a related description in the foregoing text, and details thereof are not redundantly described herein.

S714: The second base station sends the first data to the terminal according to the modified sending time of the first data.

A manner in which the second base station sends the first data to the terminal according to the modified sending time of the first data can be referenced to a related description in the foregoing text, and details thereof are not redundantly described herein.

In the embodiments of the present disclosure, firstly a system time difference between the base station and the second base station can first be determined based on an actual transmission time length of a wireless frame. Therefore, when a sending time of first data is determined based on a receiving time of second data, the sending time of the first data can be modified according to the system time difference, and the first data is sent from the second base station at the modified sending time of the first data. Since such process of data transmission does not need to rely on a synchronization of system times of each base station, this not only avoids the problem of rising data transmission costs that may be caused by global positioning systems of each base station, but also alleviates the problem of difficulty of reliably performing data transmission caused by the inability of each base station to accurately receive positioning signals. In other words, the data transmission cost is reduced, and the reliability of data transmission is improved.

Secondly, the second base station calculates a sending time of first data according to a receiving time of second data, determines a system time difference between the first base station and the second base station, and modifies the sending time of the first data according to the system time difference, further reducing the pressure on the server, and reducing the possibility of inability of reliably transmitting data due to excessive server load, i.e., improving the reliability of data transmission.

Fifth Embodiment

Figure 8:
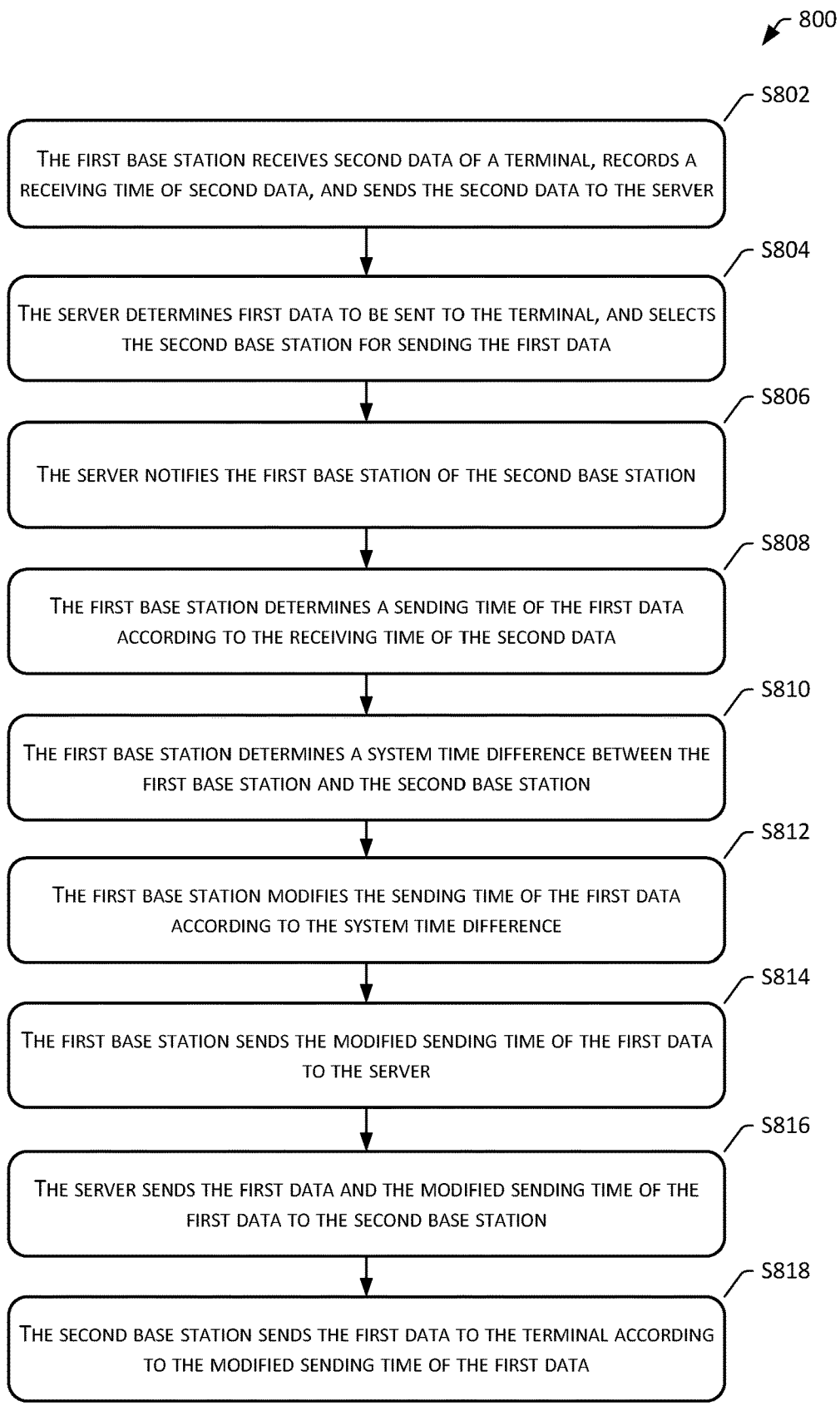
FIG. 8 shows a flowchart of a data transmission method according to a fifth embodiment of the present disclosure.

Referring to FIG. 8, a flowchart of a data transmission method 800 according to an embodiment of the present disclosure is shown. The data transmission method 800 is applied to interactions between a first base station, a second base station, and a server. In implementations, the data transmission method 800 may include the following operations.

S802: The first base station receives second data of a terminal, records a receiving time of second data, and sends the second data to the server.

A manner in which the first base station receives the second data of the terminal, records the receiving time of the second data, and sends the second data and the receiving time of the second data to the server can be referenced to a related description in the foregoing text, and details thereof are not redundantly described herein.

S804: The server determines first data to be sent to the terminal, and selects the second base station for sending the first data.

A manner in which the server determines the first data sent to the terminal and selects the second base station for sending the first data can be referenced to a related description in the foregoing text, and details thereof are not redundantly described herein.

S806: The server notifies the first base station of the second base station.

In order to facilitate the first base station to accurately calculate a sending time of sending the first data based on the receiving time of the second data, to modify the calculated sending time according to a system time difference between the first base station and the second base station, and to reduce the pressure on the server and thus enable the server to provide services to more terminals (i.e., improving the reliability of data transmission in a LoRa network), the server can notify the first base station of the second base station for sending the first data.

The server may send a base station identifier of the second base station to the first base station.

S808: The first base station determines a sending time of the first data according to the receiving time of the second data.

A manner in which the first base station determines the sending time of the first data according to the receiving time of the second data can be referenced to a related description in the foregoing text, and details thereof are not redundantly described herein.

S810: The first base station determines a system time difference between the first base station and the second base station.

The first base station may obtain a system time difference calculated by the server or the second base station from the server. Alternatively, if a wireless frame is sent by the first base station to the second base station, the first base station may obtain a receiving time of the wireless frame received by the second base station from the server, calculate a system time difference between the first base station and the second base station according to a sending time of the wireless frame and the receiving time of the wireless frame. Alternatively, if the wireless frame is sent by the second base station to the first base station, the first base station may calculate and obtain a system time difference between the first base station and the second base station based on a receiving time of receiving the wireless frame and a sending time of the wireless frame carried by the wireless frame.

S812: The first base station modifies the sending time of the first data according to the system time difference.

In order to reduce the pressure on the server, to reduce the possibility that data cannot be reliably transmitted due to excessive server load, and to improve the reliability of data transmission, the first base station may modify the sending time of the first data.

A manner in which the first base station modifies the sending time of the first data according to the system time difference can be referenced to a related description in the foregoing text, and details thereof are not redundantly described herein.

S814: The first base station sends the modified sending time of the first data to the server.

S816: The server sends the first data and the modified sending time of the first data to the second base station.

After receiving the second data, the server may determine the first data. A manner of determining the first data can be referenced to a related description in the foregoing text, and details thereof are not redundantly described herein.

S818: The second base station sends the first data to the terminal according to the modified sending time of the first data.

A manner in which the second base station sends the first data to the terminal according to the modified sending time of the first data can be referenced to a related description in the foregoing text, and details thereof are not redundantly described herein.

In the embodiments of the present disclosure, firstly a system time difference between the base station and the second base station can first be determined based on an actual transmission time length of a wireless frame. Therefore, when a sending time of first data is determined based on a receiving time of second data, the sending time of the first data can be modified according to the system time difference, and the first data is sent from the second base station at the modified sending time of the first data. Since such process of data transmission does not need to rely on a synchronization of system times of each base station, this not only avoids the problem of rising data transmission costs that may be caused by global positioning systems of each base station, but also alleviates the problem of difficulty of reliably performing data transmission caused by the inability of each base station to accurately receive positioning signals. In other words, the data transmission cost is reduced, and the reliability of data transmission is improved.

Secondly, the first base station calculates a sending time of first data according to a receiving time of second data, determines a system time difference between the first base station and the second base station, and modifies the sending time of the first data according to the system time difference, further reducing the pressure on the server, and reducing the possibility of inability of reliably transmitting data due to excessive server load, i.e., improving the reliability of data transmission.

Sixth Embodiment

Referring to FIG. 9, a flowchart of a data transmission method 900 according to an embodiment of the present disclosure is shown. The data transmission method 900 is applied to a first base station. In implementations, the data transmission method 800 may include the following operations.

S902: A first base station sends reference time information to a second base station, so that a system time difference between the first base station and the second base station is obtained based on a sending time of the reference time information carried in the reference time information and a receiving time of receiving the reference time information, and an actual transmission time length of a wireless frame which contains the reference time information, and a sending time of sending first data by the second base station is modified according to the system time difference, wherein the sending time of the first data is determined according to a receiving time of second data at the first base station.

In order to facilitate calculating a system time difference between the first base station and the second base station, and modifying a sending time of first data sent by the second base station based on the calculated system time difference, and to ensure that the second data can be accurately sent to a terminal without a need of deployment of an additional global positioning system in each base station of a LoRa network to perform time synchronization, the first base station can send reference time information to the second base station.

The system time difference between the first base station and the second base station can be calculated and obtained by the second base station according to the sending time of the reference time information and the receiving time of the reference time information, and the sending time of the first data sent by the second base station can be modified according to the system time difference. Alternatively, the system time difference between the first base station and the second base station can be calculated and obtained by the server based on the sending time of the reference time information and the receiving time of the reference time information, and the sending time of the first data sent by the second base station can be modified according to the system time difference. Alternatively, the system time difference between the first base station and the second base station can be calculated and obtained by the first base station based on the sending time of the reference time information and the receiving time of the reference time information, and the sending time of the first data sent by the second base station can be modified according to the system time difference.

In the embodiments of the present disclosure, preferably, in order to facilitate the determination of the system time difference between the first base station and the second base station and to improve the efficiency of sending the reference time information, the first base station may send the reference time information to at least one base station in the same communication area.

A manner in which the first base station sends the reference time information to the at least one base station in the same communication area can be referenced to a related description in the foregoing text, and details thereof are not redundantly described herein.

In the embodiments of the present disclosure, preferably, the first base station may receive the second data.

In the embodiments of the present disclosure, preferably, in order to improve the reliability of sending the reference time information to the second base station, and to further improve the reliability of determining the system time difference between the first base station and the second base station, the first base station may determine the second base station that is selected by the server for sending the first data.

A manner in which the first base station determines the second base station selected by the server can be referenced to a related description in the foregoing text, and details thereof are not redundantly described herein.

In the embodiments of the present disclosure, firstly, the first base station can send reference time information to the second base station, so that a system time difference between the first base station and the second base station can be determined based on a receiving time and a sending time of the reference time information, i.e., determining the system time difference between the first base station and the second base station based on an actual transmission time length of a wireless frame. Therefore, when determining a sending time of first data according to a receiving time of receiving second data by the first base station, the sending time of the first data can be corrected based on the system time difference, and the first data can be sent from the second base station at the corrected sending time of the first data. Since such process of data transmission does not need to rely on a synchronization of system times of each base station, this not only avoids the problem of rising data transmission costs that may be caused by global positioning systems of each base station, but also alleviates the problem of difficulty of reliably performing data transmission caused by the inability of each base station to accurately receive positioning signals. In other words, the data transmission cost is reduced, and the reliability of data transmission is improved.

In order to facilitate one skilled in the art to better understand the present disclosure, a method for connecting to a wireless network according to the embodiments of the present disclosure is described below using four specific examples, which specifically include the following steps.

First Example

Step S100: A base station 1 receives second data of a terminal, records a receiving time of the second data as time1, and sends the second data and time1 to a server.

Step S110: The server determines first data to be sent to the terminal, and selects a base station 2 for sending the first data.

Step S120: The server determines time1+1 as a sending time of the first data, and sends time1+1 to the base station 2.

Step S130: The base station 2 determines that a system time difference between the base station 1 and the base station 2 is Δt=5.

The base station 2 can obtain a system time difference that is relative to the base station 1 and has been calculated previously from a local storage.

The base station 1 can send reference time information to the base station 2 regularly, so that the base station 2 can calculate the system time difference relative to base station 1:

The base station 1 sends reference time information to the base station 2. A sending timestamp of the reference time information is $t_{ref1}$. A receiving timestamp of receiving the reference time information by the base station 2 is $t_{ref2}$. The base station 2 determines an actual transmission time length for the reference time information to be transmitted from the base station 1 to the base station 2 according to a data format of the reference time information is ΔT. In this case, a system time difference between the base station 1 and the base station 2 can be calculated based on $$\Delta t = \frac{t_{ref_2} - t_{ref_1}}{\Delta t_{ref}} (\Delta t_{ref} - \Delta T).$$

Step S140: The base station 2 corrects time1+1, i.e., time1+Δt, and obtains the corrected sending time of the first data as time1+6.

Since $$\Delta t = \frac{t_{ref_2} - t_{ref_1}}{\Delta t_{ref}} (\Delta t_{ref} - \Delta T),$$

the sending time of the first data can be corrected according to $t'_1 = t'_2 + \Delta t$, where $t'_2$=time1, $t'_1$=time1+6.

Step S150: The base station 2 sends the first data to the terminal in response to determining that the current system time is time1+6.

Second Example

Step S200: A base station 1 receives second data of a terminal, records a receiving time of second data as time1, and sends the second data and time1 to a server.

Step S210: The server determines first data to be sent to the terminal, and selects a base station 2 for sending the first data.

Step S220: The server determines time1+1 as a sending time of the first data.

Step S230: The server determines that a system time difference between the base station 1 and the base station 2 is Δt=5.

The server may obtain the system time difference between the base station 1 and the base station 2 that is calculated by the base station 2 from the base station 2, or may obtain the system time difference between the base station 1 and the base station 2 that is calculated by the base station 1 from the base station 1. Alternatively, the server may obtain a sending time of sending reference time information by the base station 1 and a receiving time of receiving the reference time information by the base station 2 from the base station 2, and calculate the system time difference between the base station 1 and the base station 2.

Step S240: The server corrects time1+1, i.e., time1+Δt, and obtains the corrected first data sending time as time1+6.

Step S250: The server sends the first data and time1+6 to the base station 2.

Step S260: The base station 2 sends the first data to the terminal in response to determining that the current system time is time1+6.

Third Example

Step S300: A base station 1 receives second data of a terminal, records a receiving time of the second data as time1, and sends the second data and time1 to a server.

Step S310: The server determines first data to be sent to the terminal, and selects a base station 2 for sending the first data.

Step S320: The server sends time1 and the first data to the base station 2.

Step S330: The base station 2 determines time1+1 as a sending time of the first data.

Step S340: The base station 2 determines that a system time difference between the base station 1 and the base station 2 is Δt=5.

Step S350: The base station 2 corrects time1+1, that is, time1+Δt, and obtains the corrected sending time of the first data as time1+6.

Step S360: The base station 2 sends the first data to the terminal in response to determining that the current system time is time1+6.

Fourth Example

Step S400: A base station 1 receives second data of a terminal, records a receiving time of second data as time1, and sends the second data to the server.

Step S410: The server determines first data to be sent to the terminal, and selects a base station 2 for sending the first data.

Step S420: The server notifies the base station 1 of the base station 2.

Step S430: The base station 1 determines time1+1 as a sending time of the first data.

Step S440: The base station 1 determines that a system time difference between the base station 1 and the base station 2 is Δt=5.

Step S450: The base station 1 corrects time1+1, i.e., time1+Δt, and obtains the corrected first data sending time as time1+6.

Step S460: The base station 1 sends time1+6 to the server.

Step S470: The server sends the first data and time1+6 to the base station 2.

Step S480: The base station 2 sends the first data to the terminal in response to determining that the current system time is time1+6.

Seventh Embodiment

Figure 10:
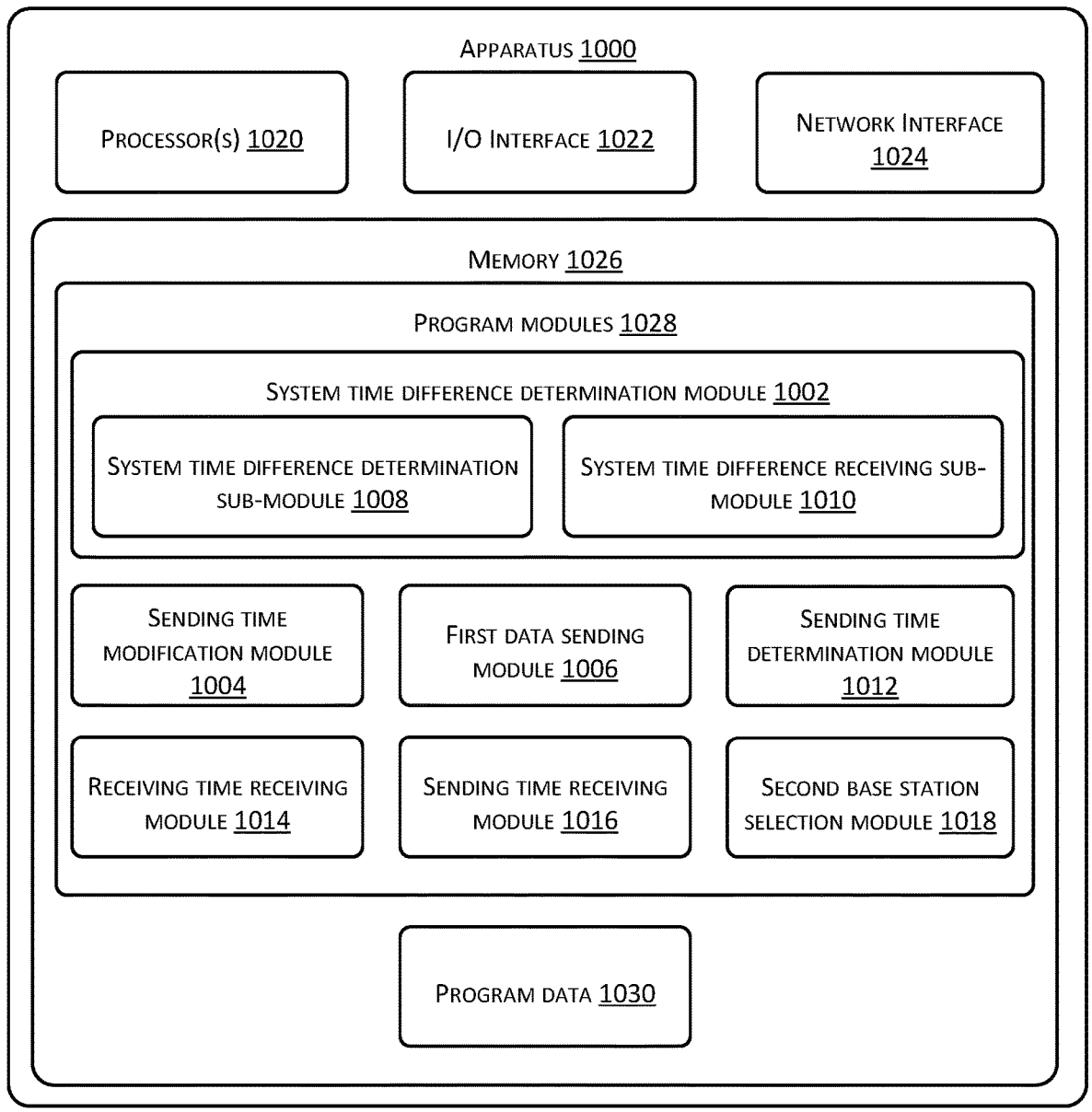
FIG. 10 shows a structural block diagram of a data transmission apparatus according to a seventh embodiment of the present disclosure.

Referring to FIG. 10, a structural block diagram of a data transmission apparatus 1000 according to an embodiment of the present disclosure is shown. The data transmission apparatus 1000 includes:

a system time difference determination module 1002 configured to determine a system time difference between a first base station and a second base station based on an actual transmission time length of a wireless frame;

a sending time modification module 1004 configured to modify a sending time of first data according to the system time difference, the sending time of the first data being determined according to a receiving time of second data at the first base station; and a first data sending module 1006 configured to send the first data from the second base station according to the modified sending time of the first data.

In implementations, the system time difference determination module 1002 includes:

a system time difference determination sub-module 1008 configured to determine a difference between a measured transmission time length taken by the wireless frame from being sent by the first base station to being received by the second base station and the actual transmission time length as the system time difference between the first base station and the second base station.

In implementations, the wireless frame is reference time information, and the reference time information carries a sending time of the reference time information.

In implementations, the system time difference determination sub-module 1008 is further configured to:

obtain a sending time at which the first base station sends the reference time information and a receiving time at which the second base station receives the reference time information;

determine the measured transmission time length based on the sending time of sending the reference time information and the receiving time of receiving the reference time information; and use the difference between the measured transmission time length and the actual transmission time length as the system time difference between the first base station and the second base station.

In implementations, the system time difference determination sub-module 1008 is further configured to:

determine the actual transmission time length taken by the wireless frame from being sent by the first base station to being received by the second base station.

In implementations, the system time difference determination sub-module 1008 is further configured to:

determine a time length of a round trip of the wireless frame between the first base station and the second base station; and determine a half of the time length of the round-trip as the actual transmission time length.

In implementations, the system time difference determination module 1002 includes:

a system time difference receiving sub-module 1010 configured to receive the system time difference between the first base station and the second base station issued by a server.

In implementations, the data transmission apparatus 1000 further includes:

a sending time determination module 1012 configured to determine the sending time of the first data according to the receiving time of the second data.

In implementations, the data transmission apparatus 1000 further includes:

a receiving time receiving module 1014 configured to receive the receiving time of the second data notified by the first base station.

In implementations, the data transmission apparatus 1000 further includes:

a sending time receiving module 1016 configured to receive the sending time of the first data sent by a server, and the sending time of the first data being determined according to the receiving time of the second data at the first base station.

In implementations, the data transmission apparatus 1000 further includes:

a second base station selection module 1018 configured to select the second base station for sending the first data.

In implementations, the apparatus 1000 may further include one or more processors 1020, an input/output interface 1022, a network interface 1024, and memory 1026.

The memory 1026 may include a form of computer readable media such as a volatile memory, a random access memory (RAM) and/or a non-volatile memory, for example, a read-only memory (ROM) or a flash RAM. The memory 1026 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 1026 may include program modules 1028 and program data 1030. The program units 1028 may include one or more modules and/or sub-modules as described in the foregoing description and FIG. 10.

In the embodiments of the present disclosure, a system time difference between a first base station and a second base station can be determined based on an actual transmission time length of a wireless frame. Therefore, when a sending time of first data is determined according to a receiving time of second data that is received by the first base station, the sending time of the first data can be modified according to the system time difference, and the first data is sent from the second base station at the modified sending time of the first data. Since a process of data transmission does not need to rely on a synchronization of system times of each base station, the problem of rising data transmission costs that may be caused by a global positioning system of each base station can be avoided, and the problem of difficulty of conducting reliable data transmission caused by the inability of each base station to accurately receive positioning signals can be alleviated. In other words, the data transmission cost is reduced, and the reliability of data transmission is improved.

Eighth Embodiment

Figure 11:
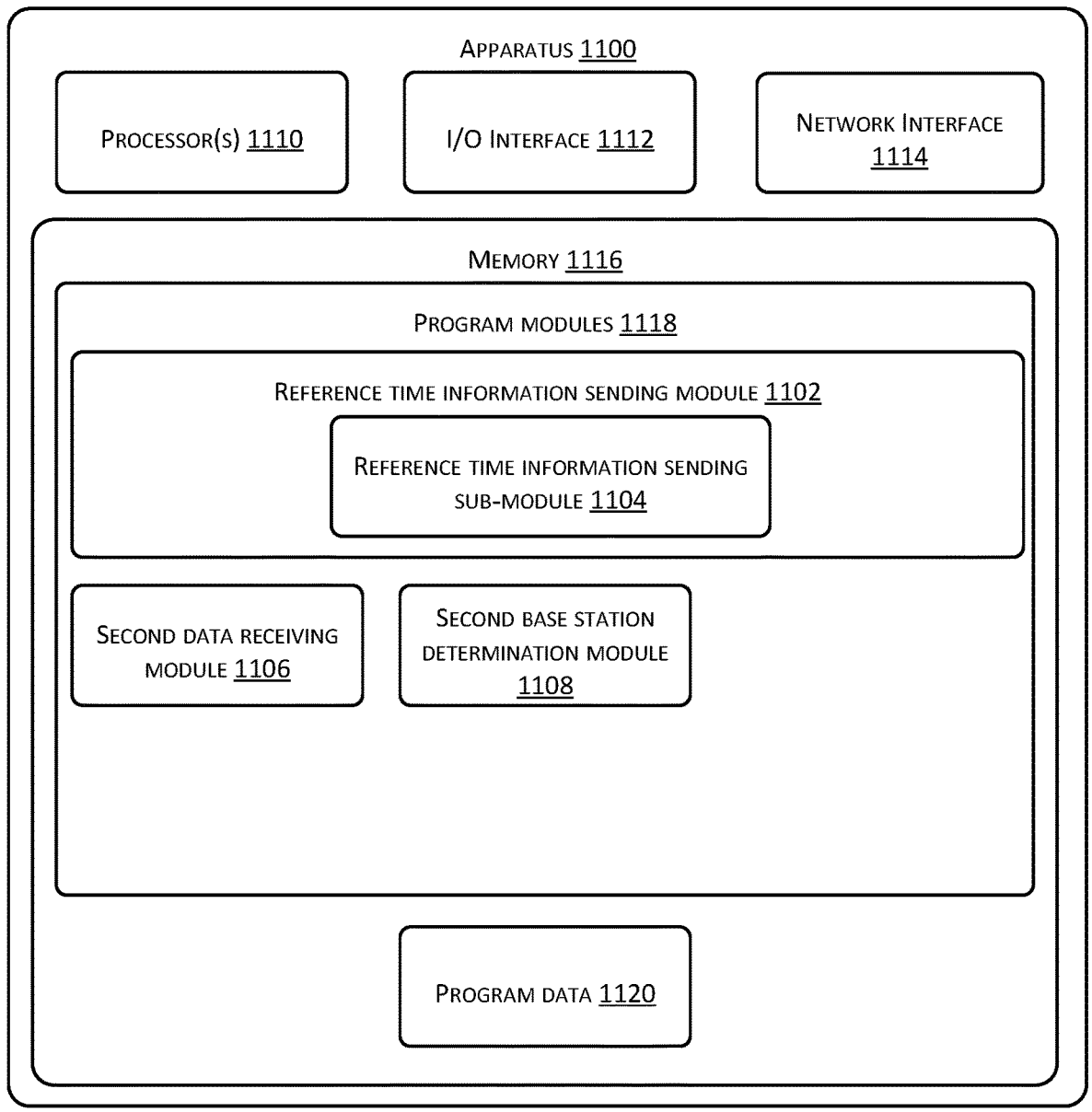
FIG. 11 shows a structural block diagram of a data transmission apparatus according to an eighth embodiment of the present disclosure.

Referring to FIG. 11, a structural block diagram of a data transmission apparatus 1100 according to an embodiment of the present disclosure is shown. The data transmission apparatus 1100 includes:

a reference time information sending module 1102 configured to send reference time information by a first base station to a second base station, obtain a system time difference between the first base station and the second base station based on an actual transmission time length of a wireless frame according to a sending time of the reference time information included in the reference time information and a receiving time of receiving the reference time information, and modify a sending time of first data sent by the second base station according to the system time difference, wherein the sending time of the first data is being determined based on a receiving time of second data at the first base station.

In implementations, the reference time information sending module 1102 includes:

a reference time information sending sub-module 1104 configured to send the reference time information to at least one base station in a same communication area.

In implementations, the data transmission apparatus 1100 further includes:

a second data receiving module 1106 configured to receive the second data.

In implementations, the data transmission apparatus 1100 further includes:

a second base station determination module 1108 configured to determine the second base station selected by the server for sending the first data.

In implementations, the apparatus 1100 may further include one or more processors 1110, an input/output interface 1112, a network interface 1114, and memory 1116.

The memory 1116 may include a form of computer readable media as described in the foregoing description. In implementations, the memory 1116 may include program modules 1118 and program data 1120. The program units 1118 may include one or more modules and/or sub-modules as described in the foregoing description and FIG. 11.

In the embodiments of the present disclosure, the first base station can send reference time information to the second base station, so that a system time difference between the first base station and the second base station can be determined according to a receiving time and a sending time of the reference time information. In other words, the system time difference between the first base station and the second base station is determined based on an actual transmission time length of a wireless frame. Therefore, when a sending time of first data is determined based on a receiving time of receiving second data by the first base station, the sending time of the first data can be modified based on the system time difference, and the first data is sent from the second base station at the modified sending time of the first data. Since such data transmission process does not need to rely on a synchronization of system times of each base station, this not only avoids the problem of increasing the data transmission cost that may be caused by global positioning systems of each base station, but also reduces the problem of difficulty of reliably performing data transmission caused by the inability of each base station to accurately receive positioning signals. In other words, the data transmission cost is reduced, and the reliability of data transmission is improved.

Ninth Embodiment

Figure 12:
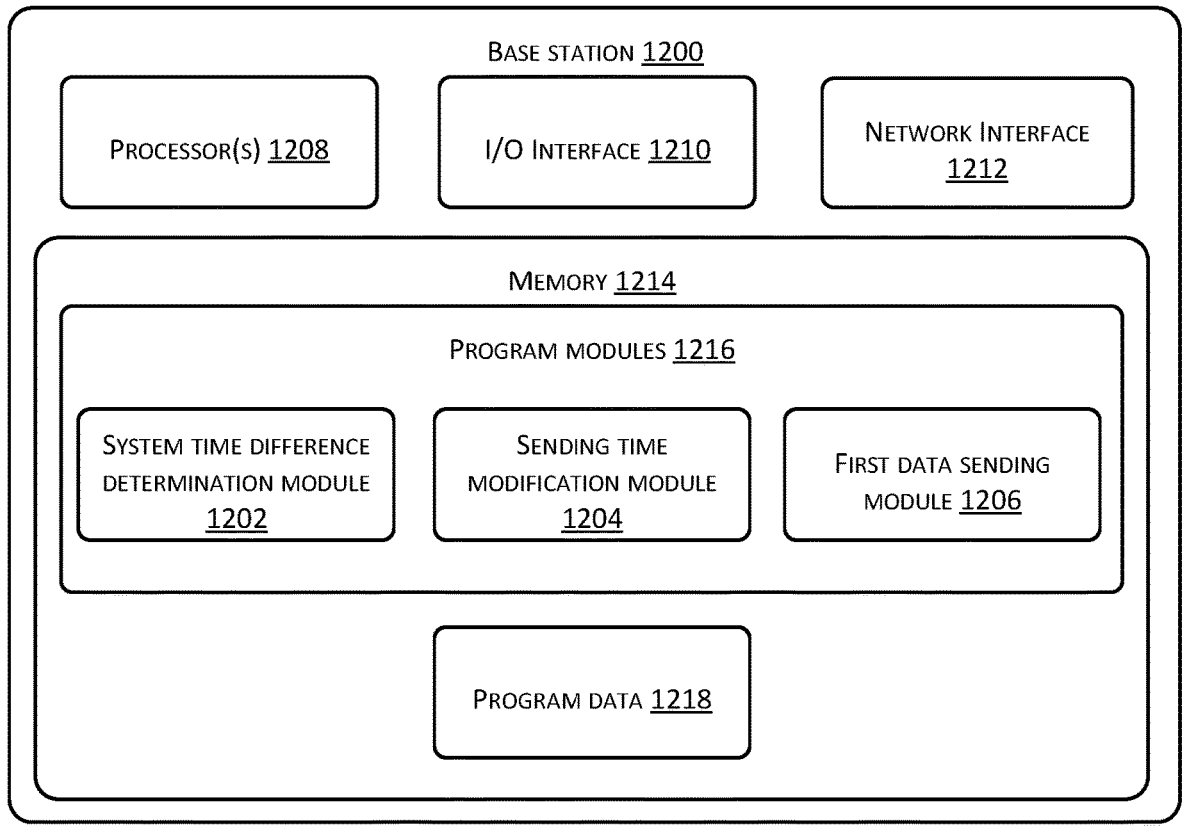
FIG. 12 shows a structural block diagram of a base station according to a ninth embodiment of the present disclosure.

Referring to FIG. 12, a structural block diagram of a base station 1200 according to an embodiment of the present disclosure is shown. The base station 1200 includes:

a system time difference determination module 1202 configured to determine a system time difference between a first base station and a second base station based on an actual transmission time length of a wireless frame;

a sending time modification module 1204 configured to modify a sending time of first data according to the system time difference, the sending time of the first data being determined according to a receiving time of second data at the first base station; and a first data sending module 1206 configured to send the first data from the second base station according to the modified sending time of the first data.

In implementations, the base station 1200 may further include one or more processors 1208, an input/output interface 1210, a network interface 1212, and memory 1214.

The memory 1214 may include a form of computer readable media as described in the foregoing description. In implementations, the memory 1214 may include program modules 1216 and program data 1218. The program units 1216 may include one or more modules and/or sub-modules as described in the foregoing description and FIG. 12.

In the embodiments of the present disclosure, a system time difference between a first base station and a second base station can be determined based on an actual transmission time length of a wireless frame. Therefore, when a sending time of first data is determined according to a receiving time of second data that is received by the first base station, the sending time of the first data can be modified according to the system time difference, and the first data is sent from the second base station at the modified sending time of the first data. Since a process of data transmission does not need to rely on a synchronization of system times of each base station, the problem of rising data transmission costs that may be caused by a global positioning system of each base station can be avoided, and the problem of difficulty of conducting reliable data transmission caused by the inability of each base station to accurately receive positioning signals can be alleviated. In other words, the data transmission cost is reduced, and the reliability of data transmission is improved.

Tenth Embodiment

Figure 13:
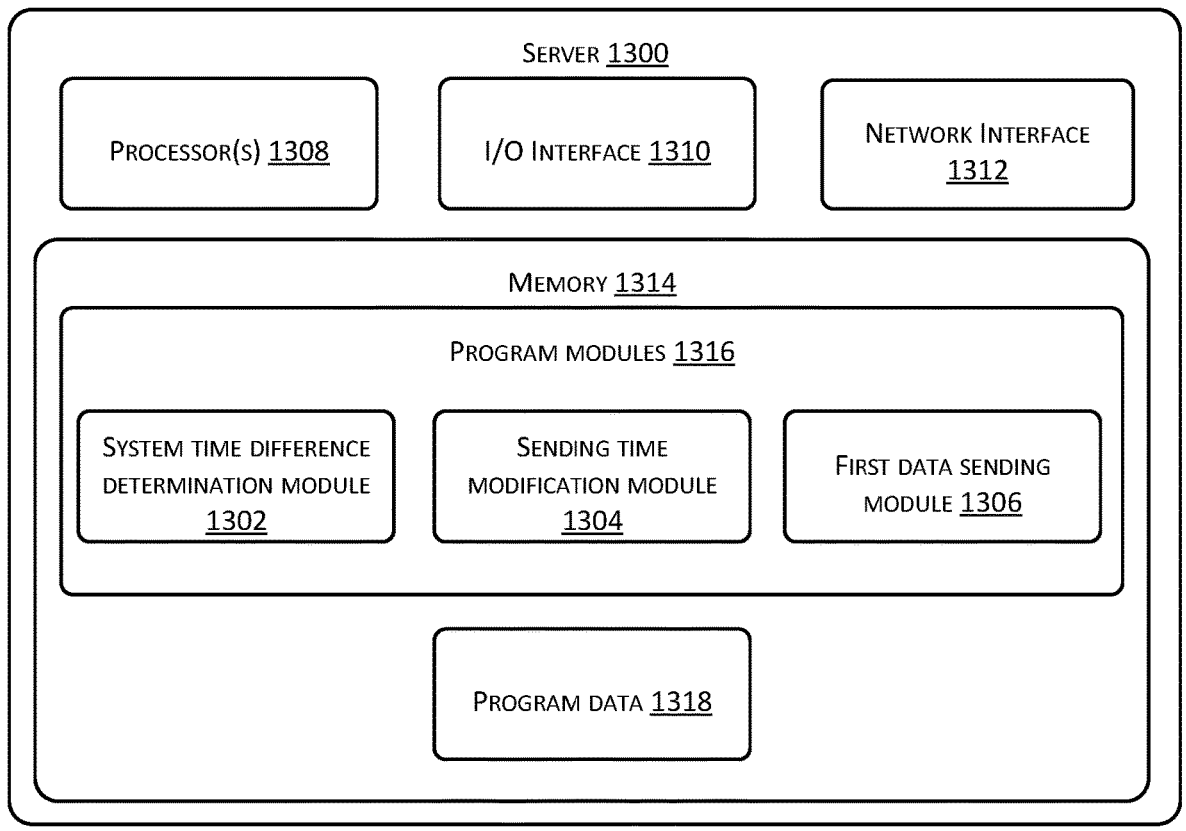
FIG. 13 shows a structural block diagram of a server according to a tenth embodiment of the present disclosure.

Referring to FIG. 13, a structural block diagram of a server 1300 according to an embodiment of the present disclosure is shown. The server 1300 includes:

a system time difference determination module 1302 configured to determine a system time difference between a first base station and a second base station based on an actual transmission time length of a wireless frame;

a sending time modification module 1304 configured to modify a sending time of first data according to the system time difference, the sending time of the first data being determined according to a receiving time of second data at the first base station; and a first data sending module 1306 configured to send the first data from the second base station according to the modified sending time of the first data.

In implementations, the server 1300 may further include one or more processors 1308, an input/output interface 1310, a network interface 1312, and memory 1314.

The memory 1314 may include a form of computer readable media as described in the foregoing description. In implementations, the memory 1314 may include program modules 1316 and program data 1318. The program units 1316 may include one or more modules and/or sub-modules as described in the foregoing description and FIG. 13.

In the embodiments of the present disclosure, a system time difference between a first base station and a second base station can be determined based on an actual transmission time length of a wireless frame. Therefore, when a sending time of first data is determined according to a receiving time of second data that is received by the first base station, the sending time of the first data can be modified according to the system time difference, and the first data is sent from the second base station at the modified sending time of the first data. Since a process of data transmission does not need to rely on a synchronization of system times of each base station, the problem of rising data transmission costs that may be caused by a global positioning system of each base station can be avoided, and the problem of difficulty of conducting reliable data transmission caused by the inability of each base station to accurately receive positioning signals can be alleviated. In other words, the data transmission cost is reduced, and the reliability of data transmission is improved.

Eleventh Embodiment

Figure 14:
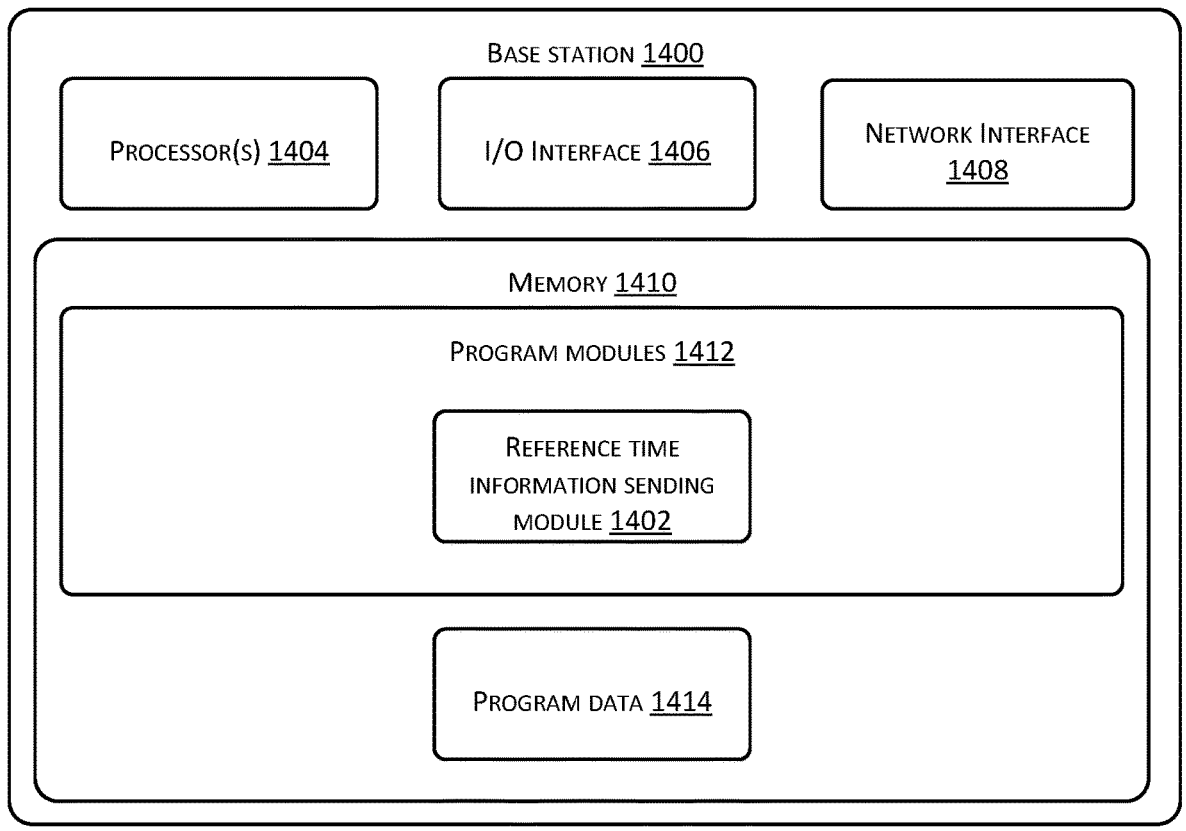
FIG. 14 shows a structural block diagram of a base station according to an eleventh embodiment of the present disclosure.

Referring to FIG. 14, a structural block diagram of a base station 1400 according to an embodiment of the present disclosure is shown. The base station 1400 includes:

a reference time information sending module 1402 configured to send reference time information by a first base station to a second base station, obtain a system time difference between the first base station and the second base station based on an actual transmission time length of a wireless frame according to a sending time of the reference time information included in the reference time information and a receiving time of receiving the reference time information, and modify a sending time of first data sent by the second base station according to the system time difference, wherein the sending time of the first data is being determined based on a receiving time of second data at the first base station.

In implementations, the base station 1400 may further include one or more processors 1404, an input/output interface 1406, a network interface 1408, and memory 1410.

The memory 1410 may include a form of computer readable media as described in the foregoing description. In implementations, the memory 1410 may include program modules 1412 and program data 1414. The program units 1412 may include one or more modules and/or sub-modules as described in the foregoing description and FIG. 14.

In the embodiments of the present disclosure, the first base station can send reference time information to the second base station, so that a system time difference between the first base station and the second base station can be determined according to a receiving time and a sending time of the reference time information. In other words, the system time difference between the first base station and the second base station is determined based on an actual transmission time length of a wireless frame. Therefore, when a sending time of first data is determined based on a receiving time of receiving second data by the first base station, the sending time of the first data can be modified based on the system time difference, and the first data is sent from the second base station at the modified sending time of the first data. Since such data transmission process does not need to rely on a synchronization of system times of each base station, this not only avoids the problem of increasing the data transmission cost that may be caused by global positioning systems of each base station, but also reduces the problem of difficulty of reliably performing data transmission caused by the inability of each base station to accurately receive positioning signals. In other words, the data transmission cost is reduced, and the reliability of data transmission is improved.

Due to their basic similarities to the method embodiments, the description of the apparatus embodiments is relatively simple. Relevant portions can be referenced to the description of the method embodiments.

Figure 15:
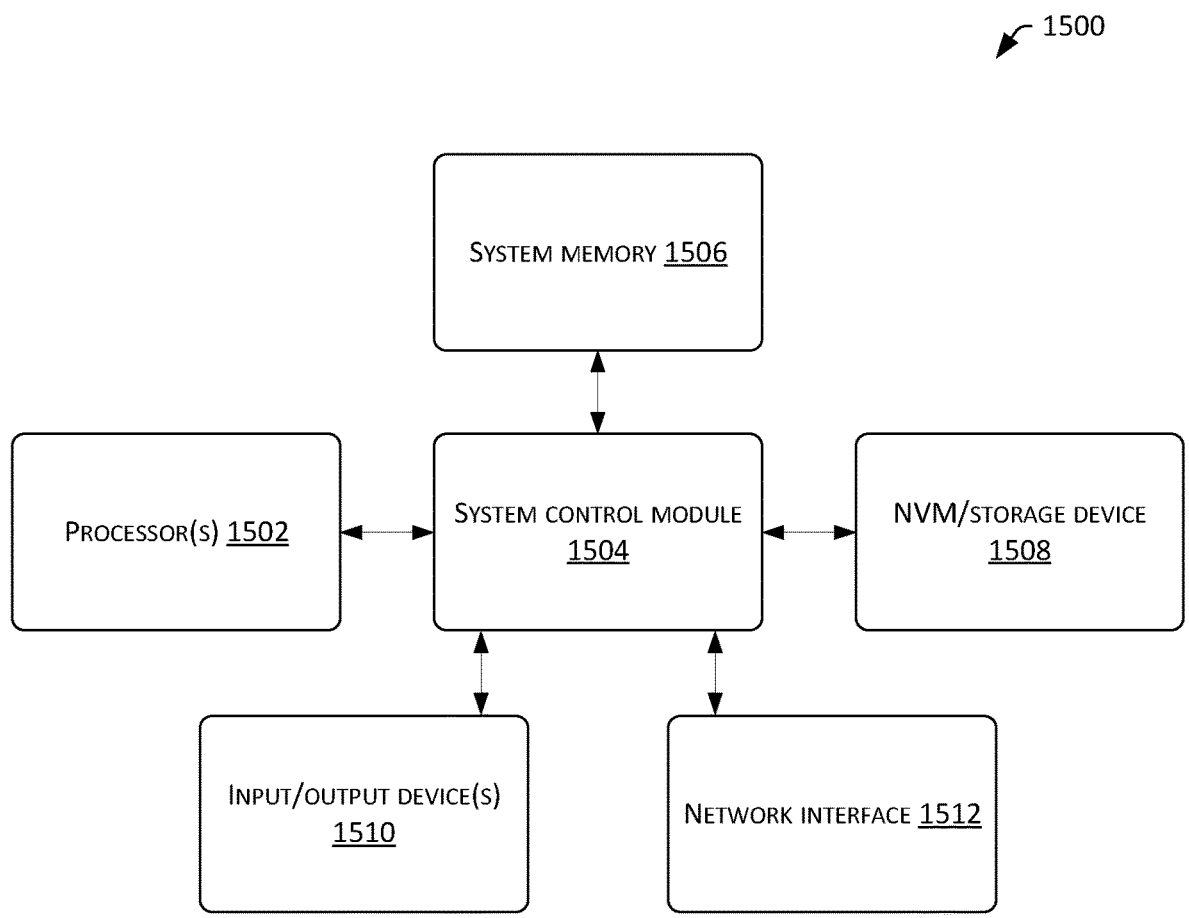
FIG. 15 shows a structural block diagram of an exemplary system according to an embodiment of the present disclosure.

The embodiments of the present disclosure can be implemented as a system using any suitable hardware, firmware, software, or any combination thereof to perform a desired configuration. FIG. 15 schematically illustrates an exemplary system (or apparatus) 1500 that can be used to implement various embodiments described in the present disclosure.

In an embodiment, FIG. 15 illustrates an exemplary system 1500. The system includes one or more processors 1502, a system control module (chipset) 1504 coupled to at least one of the processor(s) 1502, a system memory 1506 coupled to the system control module 1504, a non-volatile memory (NVM)/storage device 1508 coupled to the system control module 1504, and one or more input/output devices 1510 coupled to the system control module 1504, and a network interface 1512 coupled to the system control module 1506.

The processor 1502 may include one or more single-core or multi-core processors. The processor 1502 may include any combination of general-purpose or special-purpose processors (e.g., graphics processors, application processors, baseband processors, etc.). In some embodiments, the system 1500 can function as data transmission as described in the embodiments of the present disclosure.

In some embodiments, the system 1500 may include one or more computer readable media (e.g., the system memory 1506 or the NVM/storage device 1508) having instructions, and the one or more processors 1502 that are in conjunction with the one or more computer readable media and configured to execute the instructions to implement modules for performing the actions described in the present disclosure.

In an embodiment, the system control module 1504 may include any suitable interface controller to provide any suitable interface to at least one of the processor(s) 1502 and/or any suitable device or component that communicates with the system control module 1504.

The system control module 1504 may include a memory controller module to provide an interface to the system memory 1506. The memory controller module may be a hardware module, a software module, and/or a firmware module.

The system memory 1506 may be used for loading and storing data and/or instructions for the system 1500, for example. In an embodiment, the system memory 1506 may include any suitable volatile memory, such as a suitable DRAM. In some embodiments, the system memory 1506 may include double data rate fourth generation synchronous dynamic random access memory (DDR4 SDRAM).

In an embodiment, the system control module 1504 may include one or more input/output controllers to provide an interface to the NVM/storage device 1508 and the input/output device(s) 1510.

For example, the NVM/storage device 1508 may be configured to store data and/or instructions. The NVM/storage device 1508 may include any suitable non-volatile memory (e.g., a flash memory) and/or may include any suitable non-volatile storage device(s) (e.g., one or more hard disk drives (HDD), one or more compact disc (CD) drives, and/or one or more digital versatile disc (DVD) drives).

The NVM/storage device 1508 may include a storage resource that is a physical part of a device on which the system 1500 is installed, or that may be accessed by the device without having to be a part of the device. For example, the NVM/storage device 1508 may be accessed through a network via the input/output device(s) 1510.

The input/output device(s) 1510 may provide an interface to the system 1500 for communicating with any other suitable device. The input/output device 1510 may include a communication component, an audio component, a sensor component, etc. The network interface 1512 may provide an interface to the system 1500 for conducting communications over one or more networks. The system 1500 can conduct wireless communications with one or more components of a wireless network in accordance with any standard and/or protocol of one or more wireless network standards and/or protocols, for example, by accessing a wireless network based on a communication standard, such as WiFi, 2G or 3G, or a combination thereof for conducting wireless communications.

In an embodiment, at least one of the processor(s) 1502 can be packaged with the logic of one or more controllers (e.g., the memory controller modules) of the system control module 1504. In an embodiment, at least one of the processor(s) 1502 can be packaged with the logic of one or more controllers of the system control module 1504 to form a system in package (SiP). In an embodiment, at least one of the processor(s) 1502 can be integrated with the logic of one or more controllers of the system control module 1504 on the same mold. In an embodiment, at least one of the processor(s) 1502 can be integrated with the logic of one or more controllers of the system control module 1504 on the same mold to form a system on a chip (SoC).

In various embodiments, the system 1500 may be, but is not limited to, a workstation, a desktop computing device, or a mobile computing device (e.g., a laptop computing device, a handheld computing device, a tablet, a netbook, etc.). In various embodiments, the system 1500 may have more or fewer components and/or different architectures. For example, in some embodiments, the system 1500 includes one or more cameras, a keyboard, a liquid crystal display (LCD) screen (including a touch screen display), a non-volatile memory port, multiple antennas, a graphics chip, an application specific integrated circuit (ASIC), and speakers.

If the display includes a touch panel, the screen of the display may be implemented as a touch screen display to receive an input signal from a user. The touch panel includes one or more touch sensors to sense touches, slides, and gestures on the touch panel. The touch sensor may sense not only the boundary of a touching or sliding action, but also the duration and pressure associated with a touching or sliding operation.

The embodiments of the present disclosure further provide a non-volatile readable storage medium. The storage medium stores one or more modules (programs), and the one or more modules, when being applied in a terminal device, can cause the terminal device to execute instructions of various method steps in the embodiments of the present disclosure.

In an example, an apparatus is provided, and includes: one or more processors; and one or more machine-readable media storing instructions that, when executed by the one or more processors, cause the apparatus to perform the methods in the embodiments of the present disclosure.

In an example, one or more machine-readable media is also provided, which stores instructions that, when executed by one or more processors, cause the apparatus to perform the methods in the embodiments of the present disclosure.

The embodiments of the present disclosure disclose data transmission methods, apparatuses, base stations, and servers. In implementations, the present disclosure may further be understood using the following clauses.

Clause 1: A data transmission method including: determining a system time difference between a first base station and a second base station based on an actual transmission time length of a wireless frame; modifying a sending time of first data according to the system time difference, the sending time of the first data being determined according to a receiving time of second data at the first base station; and sending the first data from the second base station according to the modified sending time of the first data.

Clause 2: The data transmission method of Clause 1, wherein determining the system time difference between the first base station and the second base station based on the actual transmission time length of the wireless frame includes: determining a difference between a measured transmission time length taken by the wireless frame from being sent by the first base station to being received by the second base station and the actual transmission time length as the system time difference between the first base station and the second base station.

Clause 3: The data transmission method of Clause 2, wherein the wireless frame is reference time information, and the reference time information carries a sending time of the reference time information.

Clause 4: The data transmission method of Clause 3, wherein determining the difference between the measured transmission time length taken by the wireless frame from being sent by the first base station to being received by the second base station and the actual transmission time length as the system time difference between the first base station and the second base station includes: obtaining a sending time at which the first base station sends the reference time information and a receiving time at which the second base station receives the reference time information; determining the measured transmission time length based on the sending time of sending the reference time information and the receiving time of receiving the reference time information; and using the difference between the measured transmission time length and the actual transmission time length as the system time difference between the first base station and the second base station.

Clause 5: The data transmission method of Clause 2, wherein determining the difference between the measured transmission time length taken by the wireless frame from being sent by the first base station to being received by the second base station and the actual transmission time length as the system time difference between the first base station and the second base station further includes: determining the actual transmission time length taken by the wireless frame from being sent by the first base station to being received by the second base station.

Clause 6: The data transmission method of Clause 5, wherein determining the actual transmission time length taken by the wireless frame from being sent by the first base station to being received by the second base station includes: determining a time length of a round trip of the wireless frame between the first base station and the second base station; and determining a half of the time length of the round-trip as the actual transmission time length.

Clause 7: The data transmission method of Clause 1, wherein determining the system time difference between the first base station and the second base station based on the actual transmission time length of the wireless frame includes: receiving the system time difference between the first base station and the second base station issued by a server.

Clause 8: The data transmission method of Clause 1, wherein: prior to modifying the sending time of the first data according to the system time difference, the method further includes: determining the sending time of the first data according to the receiving time of the second data.

Clause 9: The data transmission method of Clause 8, wherein: prior to determining the sending time of the first data according to the receiving time of the second data, the method further includes: receiving the receiving time of the second data notified by the first base station.

Clause 10: The data transmission method of Clause 1, wherein: prior to modifying the sending time of the first data according to the system time difference, the method further includes: receiving the sending time of the first data sent by a server, and the sending time of the first data being determined according to the receiving time of the second data at the first base station.

Clause 11: The data transmission method of Clause 1, wherein: prior to determining the system time difference between the first base station and the second base station based on the actual transmission time length of the wireless frame, the method further includes: selecting the second base station for sending the first data.

Clause 12: A data transmission method including: sending reference time information by a first base station to a second base station, obtaining a system time difference between the first base station and the second base station based on an actual transmission time length of a wireless frame according to a sending time of the reference time information included in the reference time information and a receiving time of receiving the reference time information, and modifying a sending time of first data sent by the second base station according to the system time difference, wherein the sending time of the first data is being determined based on a receiving time of second data at the first base station.

Clause 13: The data transmission method of Clause 12, wherein sending the reference time information by the first base station to the second base station includes: sending the reference time information to at least one base station in a same communication area.

Clause 14: The data transmission method of Clause 12, wherein: before sending the reference time information by the first base station to the second base station, the method further includes: receiving the second data.

Clause 15: The data transmission method of Clause 14, further including: determining the second base station selected by a server for sending the first data.

Clause 16: A data transmission apparatus including: a system time difference determination module configured to determine a system time difference between a first base station and a second base station based on an actual transmission time length of a wireless frame; a sending time modification module configured to modify a sending time of first data according to the system time difference, the sending time of the first data being determined according to a receiving time of second data at the first base station; and a first data sending module configured to send the first data from the second base station according to the modified sending time of the first data.

Clause 17: A data transmission apparatus including: a reference time information sending module configured to send reference time information by a first base station to a second base station, obtain a system time difference between the first base station and the second base station based on an actual transmission time length of a wireless frame according to a sending time of the reference time information included in the reference time information and a receiving time of receiving the reference time information, and modify a sending time of first data sent by the second base station according to the system time difference, wherein the sending time of the first data is being determined based on a receiving time of second data at the first base station.

Clause 18: A base station including: a system time difference determination module configured to determine a system time difference between a first base station and a second base station based on an actual transmission time length of a wireless frame; a sending time modification module configured to modify a sending time of first data according to the system time difference, the sending time of the first data being determined according to a receiving time of second data at the first base station; and a first data sending module configured to send the first data from the second base station according to the modified sending time of the first data.

Clause 19: A server including: a system time difference determination module configured to determine a system time difference between a first base station and a second base station based on an actual transmission time length of a wireless frame; a sending time modification module configured to modify a sending time of first data according to the system time difference, the sending time of the first data being determined according to a receiving time of second data at the first base station; and a first data sending module configured to send the first data from the second base station according to the modified sending time of the first data.

Clause 20: A base station including: a reference time information sending module configured to send reference time information by a first base station to a second base station, obtain a system time difference between the first base station and the second base station based on an actual transmission time length of a wireless frame according to a sending time of the reference time information included in the reference time information and a receiving time of receiving the reference time information, and modify a sending time of first data sent by the second base station according to the system time difference, wherein the sending time of the first data is being determined based on a receiving time of second data at the first base station.

Clause 21: An apparatus including: one or more processors; and one or more machine-readable media storing instructions that, when executed by the one or more processors, cause the apparatus to perform one or more of the methods of Clauses 1-11 or Clauses 12-15.

Clause 22: One or more machine-readable media storing instructions that, when executed by one or more processors, cause an apparatus to perform one or more of the methods of claimed Clauses 1-11 or Clauses 12-15.

Although certain embodiments are intended for the purpose of illustrations and descriptions, realizations that are shown and described by embodiments having the same purpose achieved by various types of alternative and/or equivalent implementations or calculations do not depart from the scope of implementations of the present disclosure. The present disclosure is intended to cover any modifications or variations of the embodiments discussed herein.

Therefore, it is apparent that the embodiments described herein are limited only by the claims and their equivalents.

What is claimed is:

1. A method implemented by one or more computing devices, the method comprising:
   determining a system time difference between a first base station and a second base station based on an actual transmission time length of a wireless frame and a measured transmission time length of the wireless frame, the actual transmission time length of the wireless frame being at least based on a half of a time length of a round trip of the wireless frame between the first base station and the second base station, the measured transmission time length of the wireless frame being at least based on a sending time of the wireless frame at the first base station and a receiving time of the wireless frame at the second base station;
   modifying a sending time of first data according to the system time difference, the sending time of the first data being determined according to a receiving time of second data at the first base station; and
   sending the first data from the second base station according to the modified sending time of the first data.

2. The method of claim 1, wherein determining the system time difference between the first base station and the second base station based on the actual transmission time length of the wireless frame comprises determining a difference between the measured transmission time length taken by the wireless frame from being sent by the first base station to being received by the second base station and the actual transmission time length as the system time difference between the first base station and the second base station.

3. The method of claim 2, wherein the wireless frame comprises reference time information, and the reference time information comprises a sending time of the reference time information.

4. The method of claim 3, wherein determining the difference between the measured transmission time length taken by the wireless frame from being sent by the first base station to being received by the second base station and the actual transmission time length as the system time difference between the first base station and the second base station comprises:
   obtaining a sending time at which the first base station sends the reference time information and a receiving time at which the second base station receives the reference time information;
   determining the measured transmission time length based on the sending time of sending the reference time information and the receiving time of receiving the reference time information; and
   using the difference between the measured transmission time length and the actual transmission time length as the system time difference between the first base station and the second base station.

5. The method of claim 2, wherein determining the difference between the measured transmission time length taken by the wireless frame from being sent by the first base station to being received by the second base station and the actual transmission time length as the system time difference between the first base station and the second base station further comprises determining the actual transmission time length taken by the wireless frame from being sent by the first base station to being received by the second base station.

6. The method of claim 5, wherein determining the actual transmission time length taken by the wireless frame from being sent by the first base station to being received by the second base station comprises:
   determining the time length of the round trip of the wireless frame between the first base station and the second base station; and
   determining the half of the time length of the round-trip as the actual transmission time length.

7. The method of claim 1, wherein determining the system time difference between the first base station and the second base station based on the actual transmission time length of the wireless frame comprises receiving the system time difference between the first base station and the second base station issued by a server.

8. The method of claim 1, further comprising determining the sending time of the first data according to the receiving time of the second data prior to modifying the sending time of the first data according to the system time difference.

9. The method of claim 8, further comprising receiving the receiving time of the second data notified by the first base station prior to determining the sending time of the first data according to the receiving time of the second data.

10. The method of claim 1, further comprising receiving the sending time of the first data sent by a server, and the sending time of the first data being determined according to the receiving time of the second data at the first base station prior to modifying the sending time of the first data according to the system time difference.

11. The method of claim 1, wherein: prior to determining the system time difference between the first base station and the second base station based on the actual transmission time length of the wireless frame, the method further comprises selecting the second base station for sending the first data.

12. One or more computer readable media storing executable instructions that, when executed by one or more processors of a first base station, cause the one or more processors to perform acts comprising:
   sending reference time information by the first base station to a second base station;
   obtaining a system time difference between the first base station and the second base station based on an actual transmission time length of the reference time information and a measured transmission time length of the reference time information, the actual transmission time length of the reference time information being at least based on a half of a time length of a round trip of the reference time information between the first base station and the second base station, the measured transmission time length of the wireless frame being at least based on a sending time of the reference time information at the first base station and a receiving time of the reference time information at the second base station; and
   modifying a sending time of first data sent by the second base station according to the system time difference, wherein the sending time of the first data is being determined based on a receiving time of second data at the first base station.

13. The one or more computer readable media of claim 12, wherein sending the reference time information by the first base station to the second base station comprises sending the reference time information to at least one base station in a same communication area.

14. The one or more computer readable media of claim 12, the acts further comprising receiving the second data before sending the reference time information by the first base station to the second base station.

15. The one or more computer readable media of claim 14, the acts further comprising determining the second base station selected by a server for sending the first data.

16. An apparatus comprising:
one or more processors; and
memory storing executable instructions that, when executed by the one or more processors, cause the one or more processors to perform acts comprising:
determining a system time difference between a first base station and a second base station based on an actual transmission time length of a wireless frame and a measured transmission time length of the wireless frame, the actual transmission time length of the wireless frame being at least based on a half of a time length of a round trip of the wireless frame between the first base station and the second base station, the measured transmission time length of the wireless frame being at least based on a sending time of the wireless frame at the first base station and a receiving time of the wireless frame at the second base station;
modifying a sending time of first data according to the system time difference, the sending time of the first data being determined according to a receiving time of second data at the first base station; and
sending the first data from the second base station according to the modified sending time of the first data.

17. The apparatus of claim 16, wherein determining the system time difference between the first base station and the second base station based on the actual transmission time length of the wireless frame comprises determining a difference between the measured transmission time length taken by the wireless frame from being sent by the first base station to being received by the second base station and the actual transmission time length as the system time difference between the first base station and the second base station.

18. The apparatus of claim 17, wherein the wireless frame comprises reference time information, and the reference time information comprises a sending time of the reference time information.

19. The apparatus of claim 18, wherein determining the difference between the measured transmission time length taken by the wireless frame from being sent by the first base station to being received by the second base station and the actual transmission time length as the system time difference between the first base station and the second base station comprises:
obtaining a sending time at which the first base station sends the reference time information and a receiving time at which the second base station receives the reference time information;
determining the measured transmission time length based on the sending time of sending the reference time information and the receiving time of receiving the reference time information; and
using the difference between the measured transmission time length and the actual transmission time length as the system time difference between the first base station and the second base station.

20. The apparatus of claim 19, wherein determining the difference between the measured transmission time length taken by the wireless frame from being sent by the first base station to being received by the second base station and the actual transmission time length as the system time difference between the first base station and the second base station further comprises determining the actual transmission time length taken by the wireless frame from being sent by the first base station to being received by the second base station.

* * * * *